(12) United States Patent
Yang et al.

(10) Patent No.: US 12,256,449 B2
(45) Date of Patent: Mar. 18, 2025

(54) USER EQUIPMENT ASSISTED SECONDARY NODE CONFIGURATION AND PACKET DATA CONVERGENCE PROTOCOL SCHEDULING FOR MULTIPLE CONNECTIVITY

(71) Applicant: QUALCOMM Incorporated, San Diego, CA (US)

(72) Inventors: Ming Yang, San Diego, CA (US); Kausik Ray Chaudhuri, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/465,425

(22) Filed: Sep. 12, 2023

(65) Prior Publication Data
US 2023/0422330 A1  Dec. 28, 2023

Related U.S. Application Data

(63) Continuation of application No. 17/345,050, filed on Jun. 11, 2021, now Pat. No. 11,844,125.
(Continued)

(51) Int. Cl.
*H04W 76/15* (2018.01)
*H04L 1/1867* (2023.01)
(Continued)

(52) U.S. Cl.
CPC ........... *H04W 76/15* (2018.02); *H04L 1/1896* (2013.01); *H04W 28/06* (2013.01); *H04W 80/02* (2013.01)

(58) Field of Classification Search
CPC ..... H04W 76/15; H04W 28/06; H04W 80/02; H04L 1/1896
(Continued)

(56) References Cited

U.S. PATENT DOCUMENTS

2021/0067299 A1* 3/2021 Wu .................. H04W 72/1215
2022/0030650 A1   1/2022 Yang
(Continued)

FOREIGN PATENT DOCUMENTS

WO   WO-2016005765 A1 *  1/2016  ........... H04L 5/0098
WO     2017012668 A1     1/2017
WO   WO-2017182927 A1 * 10/2017  ........... H04L 1/1825

OTHER PUBLICATIONS

International Preliminary Report on Patentability—PCT/US2021/037204, The International Bureau of WIPO—Geneva, Switzerland, Feb. 2, 2023.
(Continued)

*Primary Examiner* — Intekhaab A Siddiquee
(74) *Attorney, Agent, or Firm* — Harrity & Harrity, LLP

(57) ABSTRACT

Various aspects of the present disclosure generally relate to wireless communication. In some aspects, a user equipment may transmit, to a base station, assistance information that indicates a packet data convergence protocol (PDCP) preference for multiple connectivity communications from a master node and one or more secondary nodes; and receive, from the base station, a communication that indicates a routing of a sequence of PDCP packages across the master node and one or more active secondary nodes. Numerous other aspects are provided.

20 Claims, 11 Drawing Sheets

Related U.S. Application Data

(60) Provisional application No. 62/705,942, filed on Jul. 23, 2020.

(51) Int. Cl.
*H04W 28/06* (2009.01)
*H04W 80/02* (2009.01)

(58) Field of Classification Search
USPC .......................................................... 370/329
See application file for complete search history.

(56) References Cited

U.S. PATENT DOCUMENTS

2023/0023919 A1   1/2023   Qi et al.
2023/0143942 A1*  5/2023   Wu .................. H04W 36/0069
                                                                370/311

OTHER PUBLICATIONS

International Search Report and Written Opinion—PCT/US2021/037204—ISA/EPO—Sep. 29, 2021.

\* cited by examiner

USER EQUIPMENT ASSISTED SECONDARY NODE CONFIGURATION AND PACKET DATA CONVERGENCE PROTOCOL SCHEDULING FOR MULTIPLE CONNECTIVITY

CROSS-REFERENCE TO RELATED APPLICATIONS

This application is a continuation of U.S. patent application Ser. No. 17/345,050, filed Jun. 11, 2021, which claims priority to U.S. Provisional Patent Application No. 62/705,942, filed on Jul. 23, 2020, both of which are assigned to the assignee hereof. The contents of each are incorporated herein by reference in their entireties.

FIELD OF THE DISCLOSURE

Aspects of the present disclosure generally relate to wireless communication and to techniques and apparatuses for user equipment assisted secondary node configuration and packet data convergence protocol scheduling for multiple connectivity.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a UE includes: transmitting, to a base station, assistance information that indicates a packet data convergence protocol (PDCP) preference for multiple connectivity communications from a master node and one or more secondary nodes; and receiving, from the base station, a communication that indicates a routing of a sequence of PDCP packages across the master node and one or more active secondary nodes.

In some aspects, a method of wireless communication performed by a UE includes: transmitting, to a base station, assistance information that indicates a secondary node configuration preference for multiple connectivity communications from a master node and one or more secondary nodes; and receiving, from the base station, a communication that indicates a secondary node configuration for the UE.

In some aspects, a UE for wireless communication includes: a memory and one or more processors coupled to the memory, the one or more processors configured to: transmit, to a base station, assistance information that indicates a PDCP preference for multiple connectivity communications from a master node and one or more secondary nodes; and receive, from the base station, a communication that indicates a routing of a sequence of PDCP packages across the master node and one or more active secondary nodes.

In some aspects, a UE for wireless communication includes: a memory and one or more processors coupled to the memory, the one or more processors configured to: transmit, to a base station, assistance information that indicates a secondary node configuration preference for multiple connectivity communications from a master node and one or more secondary nodes; and receive, from the base station, a communication that indicates a secondary node configuration for the UE.

In some aspects, a non-transitory computer-readable medium storing a set of instructions for wireless communication includes: one or more instructions that, when executed by one or more processors of a UE, cause the UE to: transmit, to a base station, assistance information that indicates a PDCP preference for multiple connectivity communications from a master node and one or more secondary nodes; and receive, from the base station, a communication that indicates a routing of a sequence of PDCP packages across the master node and one or more active secondary nodes.

In some aspects, a non-transitory computer-readable medium storing a set of instructions for wireless communication includes: one or more instructions that, when executed by one or more processors of a UE, cause the UE to: transmit, to a base station, assistance information that indicates a secondary node configuration preference for multiple connectivity communications from a master node and one or more secondary nodes; and receive, from the base station, a communication that indicates a secondary node configuration for the UE.

In some aspects, an apparatus for wireless communication includes: means for transmitting, to a base station, assistance information that indicates a PDCP preference for multiple connectivity communications from a master node and one or more secondary nodes; and means for receiving, from the base station, a communication that indicates a routing of a sequence of PDCP packages across the master node and one or more active secondary nodes.

In some aspects, an apparatus for wireless communication includes: means for transmitting, to a base station, assistance information that indicates a secondary node configuration preference for multiple connectivity communications from a master node and one or more secondary nodes; and means for receiving, from the base station, a communication that indicates a secondary node configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
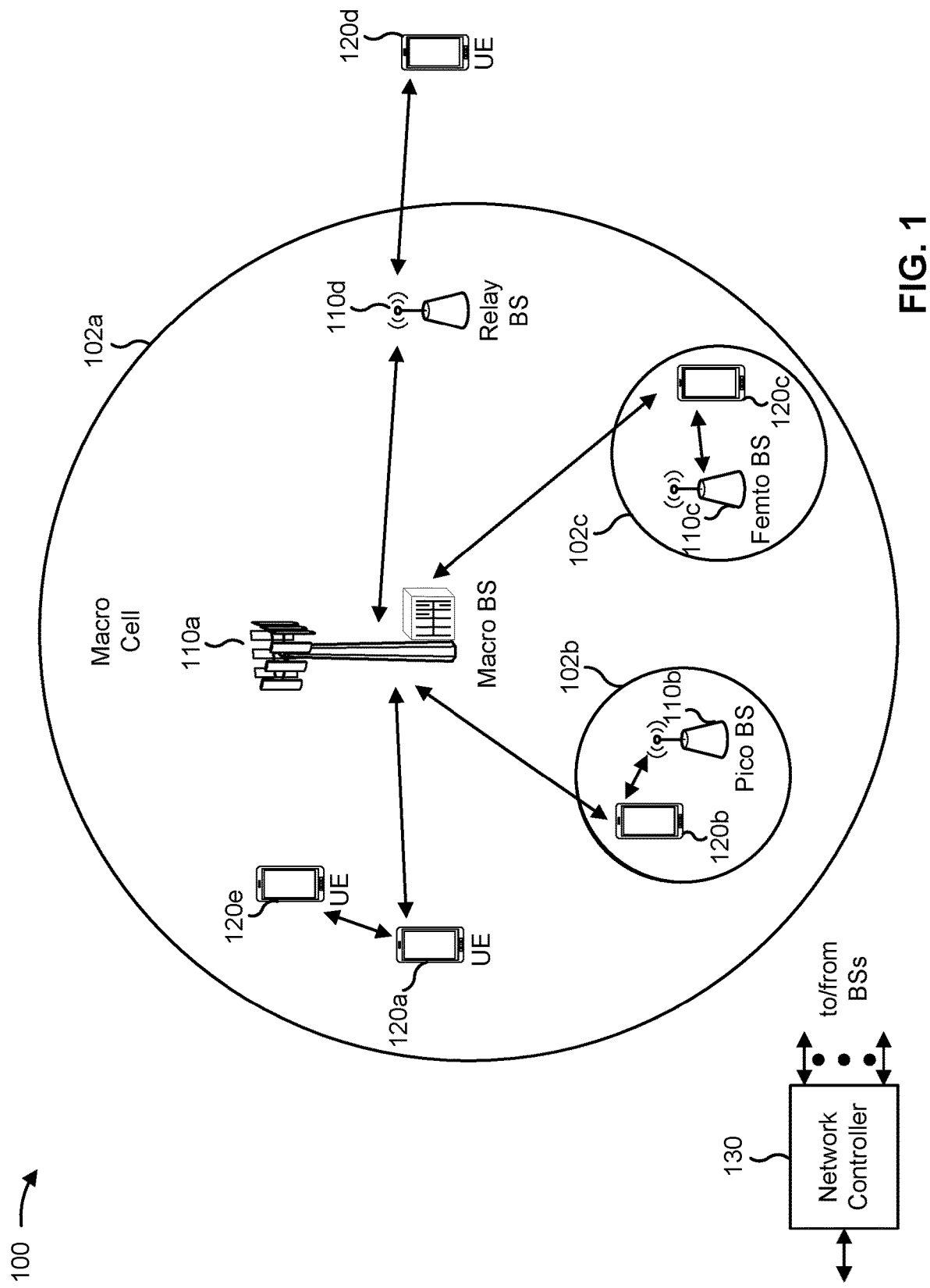
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
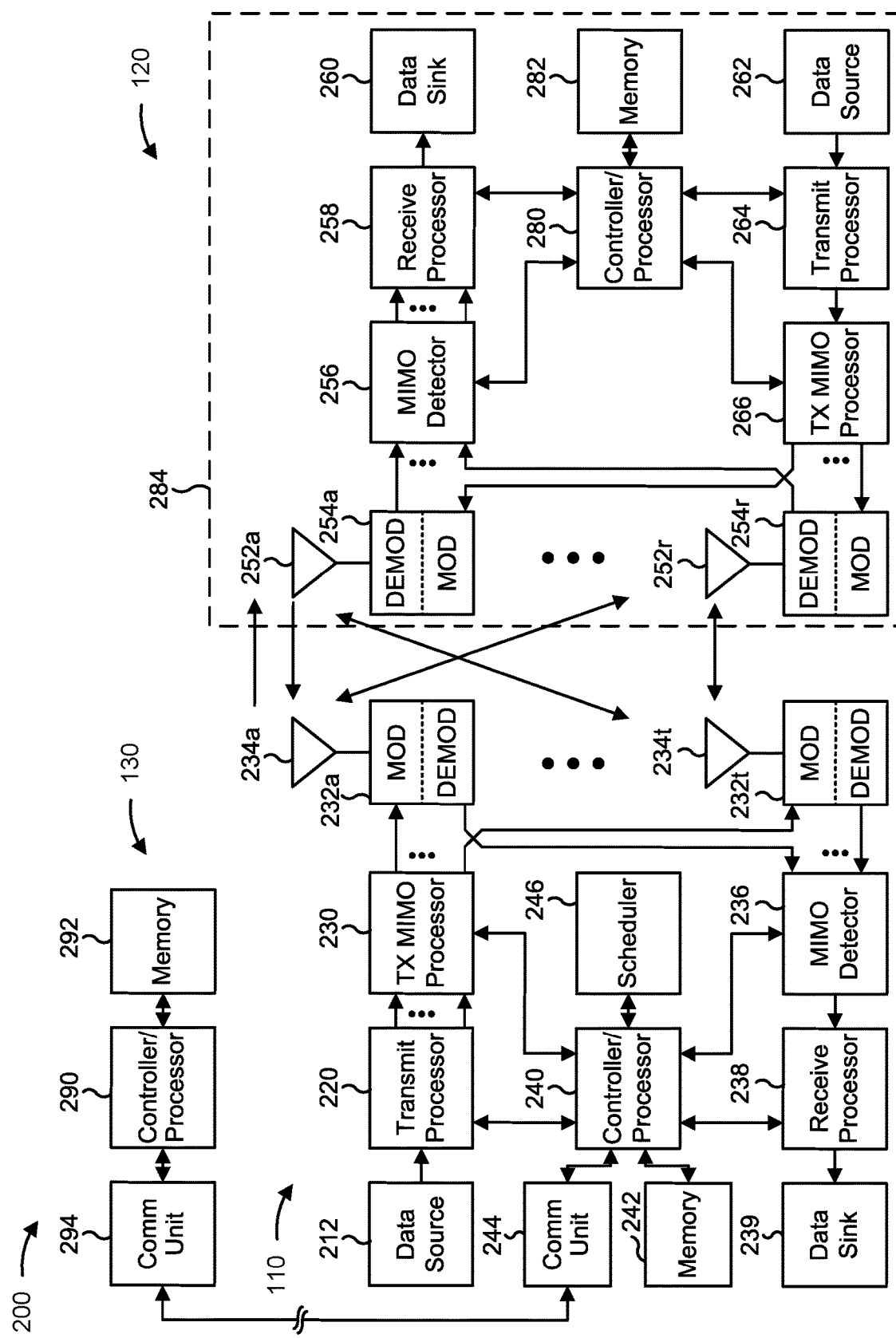
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCS s) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-11).

The controller/processor 240 of the base station 110, the controller/processor 280 of the UE 120, and/or any other component(s) of FIG. 2 may perform one or more techniques associated with UE assisted secondary node configuration and packet data convergence protocol (PDCP) scheduling for multiple connectivity, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, UE 120 may include means for transmitting, to a base station, assistance information that indicates a PDCP preference for multiple connectivity communications from a master node and one or more secondary nodes; and/or means for receiving, from the base station, a communication that indicates a routing of a sequence of PDCP packages across the master node and one or more active secondary nodes. In some aspects, such means may include one or more components of UE 120 described in connection with FIG. 2, such as controller/processor 280, transmit processor 264, TX MIMO processor 266, antenna 252, modem 254, MIMO detector 256, receive processor 258, and/or memory 282.

In some aspects, UE 120 may include means for transmitting, to a base station, assistance information that indicates a secondary node configuration preference for multiple connectivity communications from a master node and one or more secondary nodes; and/or means for receiving, from the base station, a communication that indicates a secondary node configuration for the UE. In some aspects, such means may include one or more components of UE 120 described in connection with FIG. 2, such as controller/processor 280, transmit processor 264, TX MIMO processor 266, antenna 252, modem 254, MIMO detector 256, receive processor 258, and/or memory 282.

In some aspects, base station 110 may include means for receiving, from a UE, assistance information that indicates a PDCP preference for multiple connectivity communications from a master node and one or more secondary nodes; and/or means for transmitting, to the UE, a communication that indicates a routing of a sequence of PDCP packages across the master node and one or more active secondary nodes. In some aspects, such means may include one or more components of base station 110 described in connection with FIG. 2, such as antenna 234, modem 232, MIMO detector 236, receive processor 238, controller/processor 240, transmit processor 220, TX MIMO processor 230, and/or memory 242.

In some aspects, base station 110 may include means for receiving, from a UE, assistance information that indicates a secondary node configuration preference for multiple connectivity communications from a master node and one or more secondary nodes; and/or means for transmitting, to the UE, a communication that indicates a secondary node configuration for the UE. In some aspects, such means may include one or more components of base station 110 described in connection with FIG. 2, such as antenna 234, modem 232, MIMO detector 236, receive processor 238, controller/processor 240, transmit processor 220, TX MIMO processor 230, and/or memory 242.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
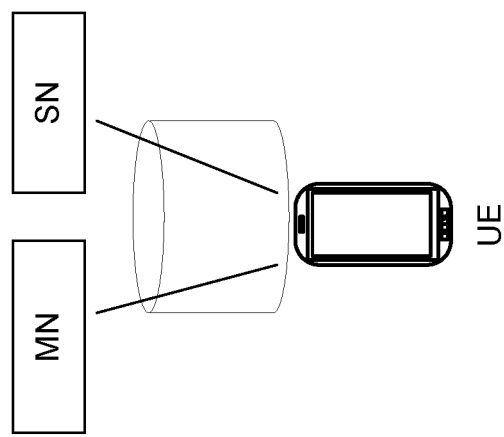
FIG. 3 is a diagram illustrating an example of NR dual connectivity, in accordance with the present disclosure.

FIG. 3 is a diagram illustrating an example 300 of NR dual connectivity, in accordance with the present disclosure.

As shown in FIG. 3, in NR, dual connectivity is a feature in which a UE may communicate with two base stations in order to increase bandwidth and decrease traffic latency. One base station acts as a master node (MN) and the other base station acts as a secondary node (SN). The MN may be an eNB (e.g., a 4G base station or LTE base station) or a gNB distributed unit (DU) (e.g., a 5G base station or NR base station). The SN may be a gNB DU (e.g., a 5G base station or NR base station). The MN and the SN may communicate (e.g., directly or indirectly) with a 4G/LTE core network and/or a core network (e.g., via a gNB control unit (CU)).

In some cases, dual connectivity may be used together with carrier aggregation. Carrier aggregation is a technology that enables two or more component carriers (sometimes referred to as carriers) to be combined (e.g., into a single channel) for a single UE to enhance data capacity. Carriers can be combined in the same or different frequency bands. Additionally, or alternatively, contiguous or non-contiguous carriers can be combined. In carrier aggregation, a UE may be configured with a primary carrier and one or more secondary carriers.

When carrier aggregation is used, there may be a number of serving cells (e.g., one for each carrier). The coverage of the serving cells may differ, for example due to different carriers on different frequency bands experiencing different pathloss. A primary serving cell (sometimes referred to as a primary cell (Pcell)) is served by the primary carrier. One or more secondary serving cells (sometimes referred to as secondary cells (Scells)) are served by the one or more secondary carriers.

In dual connectivity, the MN may communicate with the UE via a master cell group (MCG). The MCG may include multiple serving cells (e.g., a Pcell and one or more Scells) when carrier aggregation is activated. The MCG may include a single serving cell when carrier aggregation is not activated. The SN may communicate with the UE via a secondary cell group (SCG). The SCG may include multiple serving cells (e.g., a Pcell and one or more Scells) when carrier aggregation is activated. The Pcell of an SCG may be referred to as a primary secondary cell (PScell). The SCG may include a single serving cell when carrier aggregation is not activated. In some cases, the MCG may anchor a network connection between the UE 120 and the 4G/LTE core network or the 5G/NR core network (e.g., for mobility, coverage, and/or control plane information), and the SCG may be added as additional carriers to increase throughput (e.g., for data traffic and/or user plane information).

As indicated above, FIG. 3 is provided as an example. Other examples may differ from what is described with regard to FIG. 3.

Figure 4:
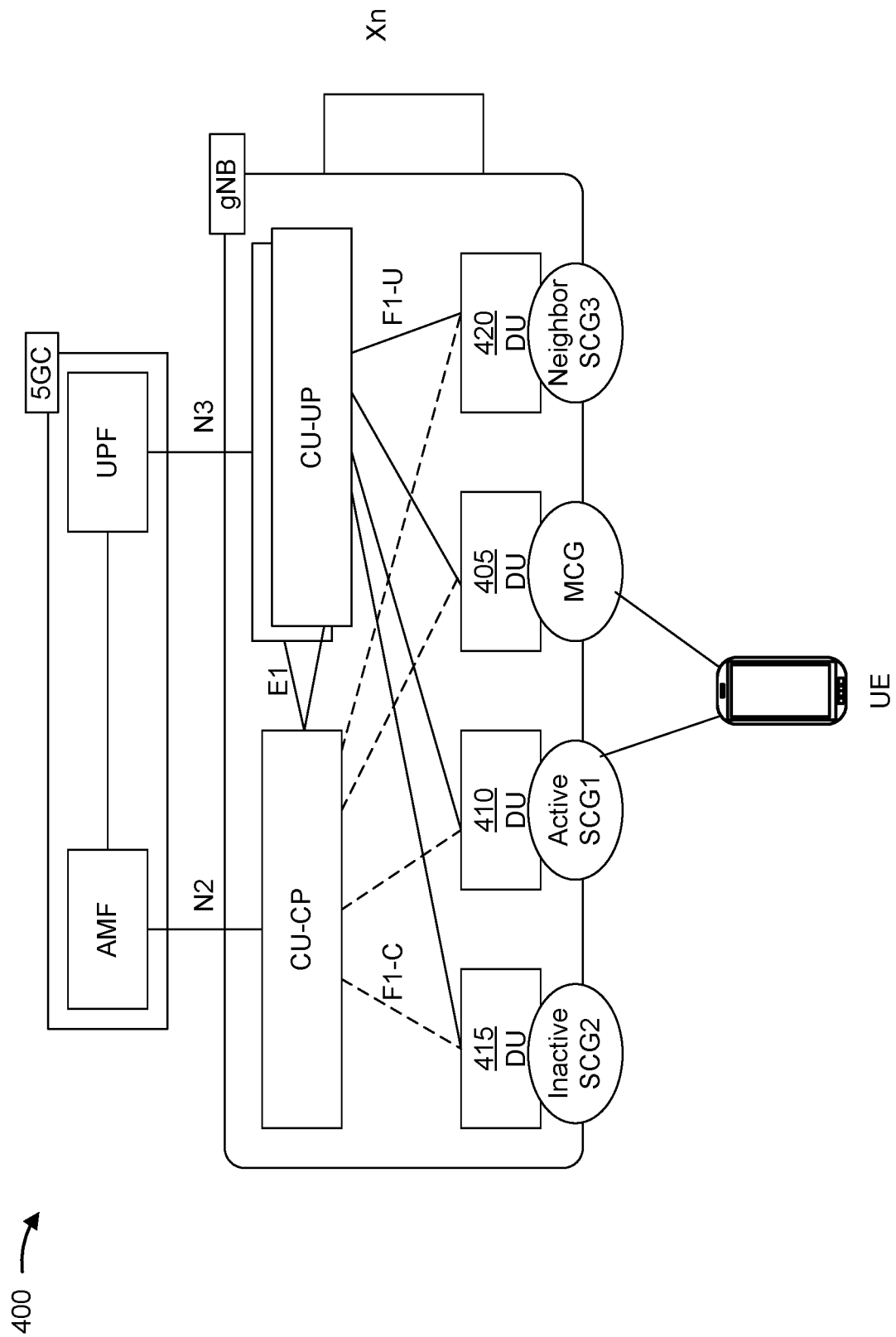
FIG. 4 is a diagram illustrating an example of NR multiple connectivity, in accordance with the present disclosure.

FIG. 4 is a diagram illustrating an example 400 of NR multiple connectivity, in accordance with the present disclosure. In multiple connectivity, a UE may communicate with two or more base stations in order to increase bandwidth and decrease traffic latency. Multiple connectivity may include one or multiple MNs and one or multiple SNs.

As shown in FIG. 4, multiple connectivity may be implemented by extending dual connectivity to include multiple SNs/SCGs. In FIG. 4, DUs 405, 410, 415, and 420 may be gNB DUs (e.g., 5G base stations or NR base stations). In the example of FIG. 4, DU 405 is the MN for multiple connectivity communications with the UE. DU 405 may communicate with the UE via the MCG. Alternatively, the MN may be an eNB (e.g., a 4G base station or LTE base station). DU 410 is a first SN and DU 415 is a second SN. The first SN (DU 410), when activated for the UE, may communicate with the UE via SCG1. The second SN (DU 420), when activated for the UE, may communicate with the UE via SCG2. DU 420 is a neighboring DU. For example, the UE may be outside of a coverage area of DU 420 provided by SCG3. DU 420 may be used as an SN when the UE moves into the coverage area of DU 420.

As further shown in FIG. 4, the DUs 405, 410, 415, and 420 may be associated with the same control unit control plane (CU-CP) and may be associated with multiple control unit user planes (CU-UPs). The CU-CP may communicate with the DUs 405, 410, 415, and 420 via an F1-control function (F1-C) interface. The CU-UPs may communicate with the DUs 405, 410, 415, and 420 via an F1-use function (F1-U) interface. The CU-CP and the CU-UPs may communicate via an E1 interface. An Xn interface may be used for communications between multiple gNB control units. The gNB control unit may communicate with the 5G core network. The CU-CP may communicate with an access and mobility management function (AMF) of the 5G core network via an N2 interface. The CU-UPs may communicate with a user plane function (UPF) of the 5G core network via an N3 interface.

As shown in FIG. 4, multiple SNs (DU 410 and DU 415) may be configured for the UE. In order to manage multiple connectivity communications, an SN (e.g., DU 410 and/or DU 415) may be activated or deactivated quickly using downlink control information (DCI), medium access control (MAC) control element (MAC-CE), and/or radio resource control (RRC) signaling. When one SN (e.g., DU 410) is activated, other SNs (e.g., DU 415) may be switched to a dormant/suspended state for power saving purposes. For an SN in a dormant/suspended state (e.g., SN 415), there is no active data transmission between the SN and the UE, and the UE does not perform physical downlink control channel (PDCCH) monitoring. For candidate SNs configured for the UE (e.g., DU 410 and DU 415), relaxed radio resource management (RRM) is performed by the UE for PScells of the candidate SNs. Resource link monitoring (RLM) (e.g., PDCCH monitoring) is performed by the UE for the PScell of the activated SN (e.g., DU 410).

As described above, multiple connectivity may utilize a single SN or multiple SNs. In order to manage multiple connectivity using a single SN or multiple SNs, SN configuration and SN switching are performed completely by a base station (or multiple base stations) without considering UE preferences and/or UE information relating to UE buffer size, mobility, radio frequency variation, quality of service (QoS) parameters, and/or battery consumption. This may result in decreased throughput and/or increased latency. For example, in a case where the MN is allocated a PDCP sequence to be transmitted to the UE, the MN forwards different portions of the PDCP sequence to multiple SNs for transmission to the UE. Multiple SN schedulers independently schedule transmission of portions (e.g., data blocks) of the PDCP sequence. The independent scheduling and transmission of portions of the PDCP sequence by multiple SNs leads to out of order delivery of the PDCP sequence, resulting in large gaps between portions of the PDCP sequence delivered in parallel by the SNs. This causes long latency for the UE waiting to perform PDCP reordering, which leads to increased latency and decreased throughput of network traffic. In addition, large PDCP sequence gaps may cause the UE to use a larger buffer for PDCP reordering.

Some techniques and apparatuses described herein enable a UE to transmit, to a base station, assistance information that includes a PDCP protocol preference and/or a secondary node configuration preference for multiple connectivity communications from an MN and one or more SNs. The base station may utilize the assistance information in configuring the one or more SNs for multiple connectivity communications for the UE and/or scheduling transmission of a PDCP sequence to the UE by the MN and the one or more SNs. As a result, the base station can tailor the SN configuration and the PDCP transmission to the preferences of the UE. This may decrease latency, increase throughput, and allow the UE to conserve computing resources (e.g., memory resources and/or processing resources) associated with the buffer for PDCP recording.

As indicated above, FIG. 4 is provided as an example. Other examples may differ from what is described with regard to FIG. 4.

Figure 5:
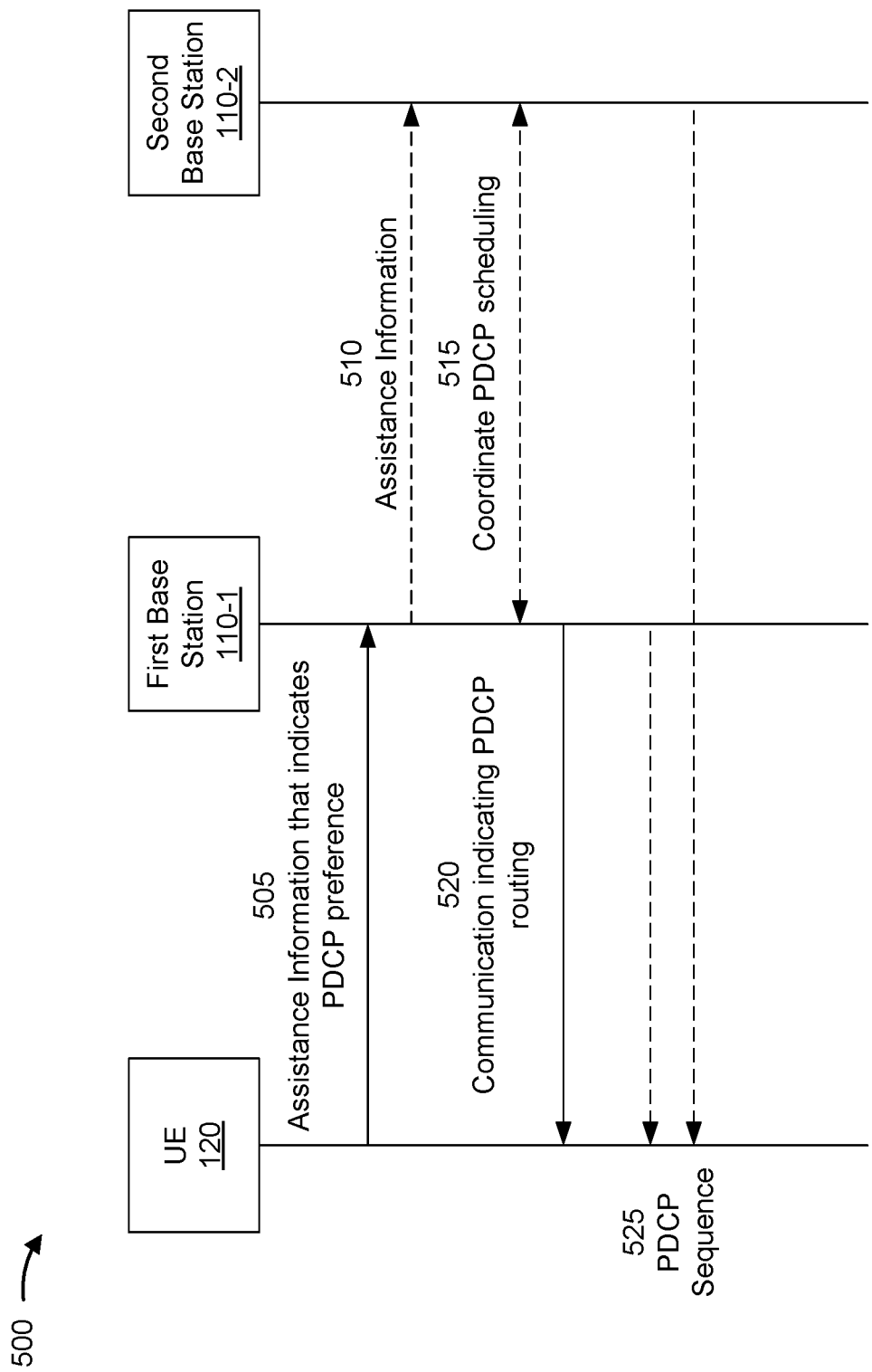
FIG. 5 is a diagram illustrating an example associated with UE assisted packet data convergence protocol (PDCP) scheduling for multiple connectivity, in accordance with the present disclosure.

FIG. 5 is a diagram illustrating an example 500 associated with UE assisted PDCP scheduling for multiple connectivity, in accordance with the present disclosure. As shown in FIG. 5, example 500 includes communication between a UE 120, a first base station 110-1, and a second base station 110-2. The base stations 110 and the UE 120 may be included in a wireless network, such as wireless network 100 illustrated and described above in connection with FIG. 1. The base stations 110 and the UE 120 may communicate on a wireless access link, which may include an uplink and a downlink.

As shown by reference number 505, the UE 120 may transmit, to the first base station 110-1, assistance information that indicates a PDCP preference for multiple connectivity communications with an MN and one or more SNs. In some aspects, the first base station 110-1 may be the MN and the second base station may be an SN. In some aspects, the first base station 110-1 may be an SN and second base station 110-2 may be the MN. The assistance information may be transmitted from the UE 120 to the first base station 110-1 in an RRC communication, an uplink MAC-CE, a channel status information (CSI) report, and/or a combination thereof.

In some aspects, the UE 120 may transmit the assistance information to the first base station 110-1 during a call setup, call resume, and/or call handover. For example, the UE 120 may transmit the assistance information in at least one of an RRC setup request, an RRC resume request, or a measurement report for a handover.

In some aspects, the UE 120 may transmit the assistance information to the first base station 110-1 during an ongoing call. For example, the UE 120 may transmit the assistance information in at least one of an uplink MAC-CE, a CSI report, or an RRC communication during an ongoing call.

The assistance information may include the PDCP preference and/or other UE-specific preferences relating to multiple connectivity for the UE 120. In some aspects, the PDCP preference, and/or other UE-specific preferences may be based at least in part on a buffer size of the UE 120, radio frequency variation of the UE 120, QoS parameters for traffic associated with the UE 120, power/battery consumption of the UE 120, mobility of the UE 120, or a combination thereof.

In some aspects, the PDCP preference indicated in the assistance information may include a PDCP sequence gap preference for the UE 120. A PDCP sequence includes multiple data blocks (PDCP packages) that are assigned respective sequence numbers. As used herein, a "portion" of a PDCP sequence refers to one or more data blocks (PDCP packages) of the PDCP sequence. A PDCP sequence gap is a gap between the sequence numbers of portions (e.g., PDCP packages) of the PDCP sequence delivered to the UE 120 in parallel (e.g., in a same time slot) from the MN and the SN(s). The PDCP sequence gap preference may be a preference relating to a size of the PDCP sequence gap for portions of a PDCP sequence transmitted to the UE 120 by the MN and the SN(s). In some aspects, the PDCP sequence gap preference may specify a maximum PDCP sequence gap and/or a minimum PDCP sequence gap for the UE 120. The PDCP sequence gap preference may be based at least in part on the buffer size of the UE 120, latency parameters of traffic associated with the UE 120, and/or a combination thereof.

In some aspects, the PDCP preference indicated in the assistance information may include a PDCP arrival time preference for the UE 120. The PDCP arrival time preference may be a preference relating to arrival times for portions of a PDCP sequence transmitted to the UE 120 by the MN and the SN(s). In some aspects, the PDCP arrival time preference may specify a maximum time difference between arrivals, at the UE 120, of consecutive portions of the PDCP sequence from the MN and the SN(S). The PDCP arrival time preference may be based at least in part on the buffer size of the UE 120, latency parameters of traffic associated with the UE 120, and/or a combination thereof.

In some aspects, the PDCP preference indicated in the assistance information may include a PDCP splitting preference and/or a PDCP routing preference. The PDCP splitting preference indicates a preference as to whether the MN or one of the active SNs performs splitting of the PDCP packages of the PDCP sequence. The PDCP routing preference indicates a preference as to whether the MN or one of the active SNs performs routing of the PDCP packages of the PDCP sequence.

As further shown in FIG. 5, and by reference number 510, the first base station 110-1 may transmit the assistance information to the second base station 110-2. In some aspects, the first base station 110-1 may be the MN and the second base station 110-2 may be an SN. In this case, the first base station 110-1 (MN) may transmit the assistance information received from the UE 120 to the second base station 110-2 and/or one or more other SN base stations.

In some aspects, the first base station 110-1 may be an SN and the second base station 110-2 may be the MN. In this case, the first base station 110-1 (SN) may transmit the assistance information received from the UE 120 to the second base station 110-2 (MN). The second base station 110-2 (MN) may then transmit the assistance information to one or more other SN base stations. Additionally, and/or alternatively, the first base station 110-1 (SN) may send the assistance information to the second base station 110-2 (MN) and one or more other SN base stations.

As further shown in FIG. 5, and by reference number 515, the first base station 110-1 and/or the second base station 110-2 may coordinate PDCP scheduling for the UE 120 based at least in part on the assistance information.

In some aspects, the MN (e.g., the first base station 110-1 or the second base station 110-2) and one or more SNs (e.g., the first base station 110-1 or the second base station 110-2, and/or one or more other base stations) may coordinate routing and/or scheduling of a PDCP sequence based at least in part on the assistance information. The MN may coordinate with the SN(s) to determine routing of the PDCP sequence across the MN and the SN(s) to the UE 120 based at least in part on the PDCP preference and/or the SN configuration preference included in the assistance information. For example, the MN may coordinate with the SN(s) to determine which portions of the PDCP sequence will be transmitted by the MN and the SN(s) based at least in part on the PDCP preference and/or the SN configuration preference included in the assistance information.

In some aspects, the MN may coordinate with the SN(s) to schedule transmission of the portions of the PDCP sequence by the MN and the SN(s) based at least in part on the PDCP preference. For example, the MN and the SN(s) may communicate scheduling information (e.g., via the Xn interface) and coordinate scheduling transmission of the portions of the PDCP sequence by the MN and SN(s) based at least in part on the scheduling information, the PDCP sequence gap preference, and/or the PDCP arrival time preference. The MN and/or SN(s) may adjust scheduled transmissions of one or more portions of the PDCP sequence to satisfy the PDCP sequence gap preference and/or the PDCP arrival time preference. For example, an offset may be added to delay transmission of a portion of the PDCP sequence by the MN or an SN to satisfy the PDCP sequence gap preference and/or the PDCP arrival time preference. In some aspects, the PDCP sequence gap preference and/or the PDCP arrival time preference may be included as an input for multiple connectivity scheduling by the MN and/or the SN(s).

As further shown in FIG. 5, and by reference number 520, the first base station 110-1 may transmit, to the UE 120, a communication indicating PDCP routing for the UE 120. For example, the communication may be an RRC communication, PDCCH DCI, a downlink MAC-CE, and/or a combination thereof.

In some aspects, the first base station 110-1 may transmit the communication to the UE 120 during a call setup, call resume, or handover. For example, the communication may be an RRC configuration and/or an RRC reconfiguration based at least in part on an RRC setup request, RRC resume request, and/or measurement report received from the UE 120.

In some aspects, the first base station 110-1 may transmit the communication during an ongoing call. For example, the communication may be at least one of a PDCCH DCI, a downlink MAC-CE, or an RRC reconfiguration transmitted from the first base station 110-1 to the UE 120 during an ongoing call.

The communication may include an indication of the routing of a PDCP sequence across the MN and the SN(s) based at least in part on the assistance information. In some aspects, the communication may include an indication relating to scheduling transmission, to the UE 120, of the portions of the PDCP sequence from the MN and SN(s) based at least in part on the PDCP sequence gap preference and/or the PDCP arrival time preference. In some aspects, the communication may include at least one portion of the PDCP sequence scheduled based at least in part on the PDCP sequence gap preference and/or the PDCP arrival time preference.

As further shown in FIG. 5, and by reference number 525, the UE 120 may receive portions of a PDCP sequence from the first base station 110-1 (e.g., MN or SN), the second base station 110-2 (e.g., SN or MN), and/or one or more other SN base stations. As described above, the routing of the PDCP sequence across the MN and SN(s) and the scheduling of transmissions of the portions of the PDCP sequence by the MN and SN(s) may be determined based at least in part on the assistance information. The UE 120 may receive portions of the PDCP sequence transmitted on the MCG associated with the MN and the SCG(s) associated with the activated (non-dormant) SN(s).

As described above, the UE 120 may transmit, to the base station 110, assistance information that indicates a PDCP preference for multiple connectivity with an MN and one or more SNs. The first base station 110-1 (e.g., MN or SN) may coordinate with the second base station 110-2 (e.g., SN or MN) to determine PDCP routing and scheduling for the UE 120 based at least in part on the assistance information. As a result, the PDCP routing/scheduling can be tailored to the preferences of the UE 120, which may increase throughput, decrease latency, and increase power conservation by the UE 120.

As indicated above, FIG. 5 is provided as an example. Other examples may differ from what is described with respect to FIG. 5.

Figure 6:
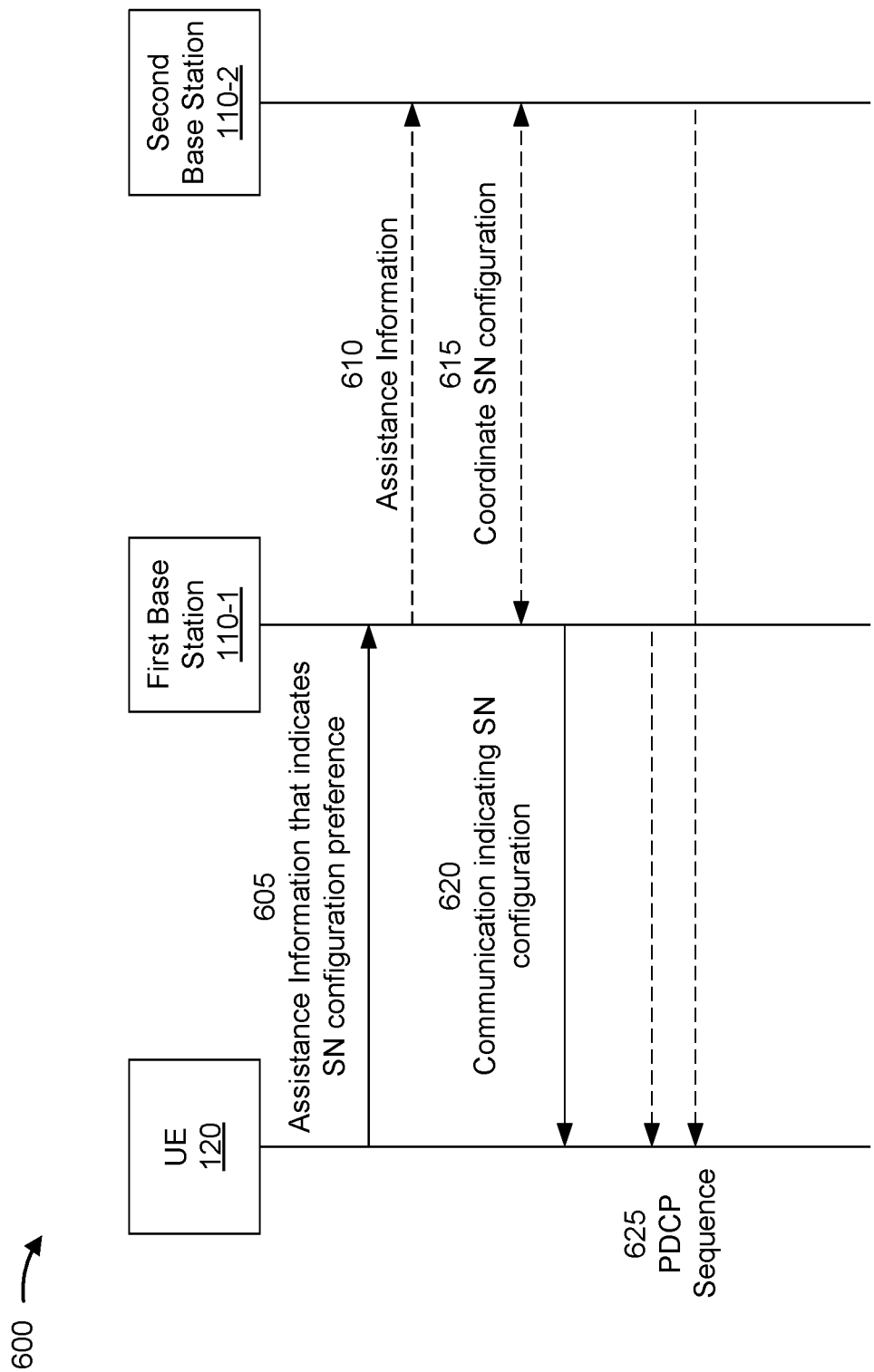
FIG. 6 is a diagram illustrating an example associated with UE assisted secondary node configuration for multiple connectivity, in accordance with the present disclosure.

FIG. 6 is a diagram illustrating an example 600 associated with UE assisted SN configuration for multiple connectivity, in accordance with the present disclosure. As shown in FIG. 6, example 600 includes communication between a UE 120, a first base station 110-1, and a second base station 110-2. The base stations 110 and the UE 120 may be included in a wireless network, such as wireless network 100 illustrated and described above in connection with FIG. 1. The base stations 110 and the UE 120 may communicate on a wireless access link, which may include an uplink and a downlink.

As shown by reference number 605, the UE 120 may transmit, to the first base station 110-1, assistance information that indicates an SN configuration preference for multiple connectivity communications with an MN and one or more SNs. In some aspects, the first base station 110-1 may be the MN and the second base station may be an SN. In some aspects, the first base station 110-1 may be an SN and second base station 110-2 may be the MN. The assistance information may be transmitted from the UE 120 to the first base station 110-1 in an RRC communication, an uplink MAC-CE, a CSI report, and/or a combination thereof.

In some aspects, the UE 120 may transmit the assistance information to the first base station 110-1 during a call setup, call resume, and/or call handover. For example, the UE 120 may transmit the assistance information in at least one of an RRC setup request, an RRC resume request, or a measurement report for a handover.

In some aspects, the UE 120 may transmit the assistance information to the first base station 110-1 during an ongoing call. For example, the UE 120 may transmit the assistance information in at least one of an uplink MAC-CE, a CSI report, or an RRC communication during an ongoing call.

The assistance information may include the SN configuration preference and/or other UE-specific preferences relating to multiple connectivity for the UE 120. In some aspects, the SN configuration preference and/or other UE-specific preferences may be based at least in part on a buffer size of the UE 120, radio frequency variation of the UE 120, QoS parameters for traffic associated with the UE 120, power/battery consumption of the UE 120, mobility of the UE 120, or a combination thereof.

In some aspects, the SN configuration preference indicated in the assistance information may include a preferred number of activated SNs and/or a preferred number of deactivated SNs for the UE 120. For example, the UE 120 may specify a lower number of activated SNs to conserve battery power or may specify a higher number of activated SNs to satisfy QoS parameters for traffic associated with the UE 120.

In some aspects, the SN configuration preference may include a preference regarding which SNs are to be activated and/or which SNs are to be deactivated. For example, the SN configuration preference may specify a preferred set of activated SNs and a preferred set of deactivated SNs.

In some aspects, the SN configuration preference may include a preference regarding whether to activate SNs in a non-dormant state or a dormant state. For example, the SN configuration preference may specify a preferred set of non-dormant activated SNs and a preferred set of dormant activated SNs.

In some aspects, the SN configuration preference may include one or more UE feedback preferences for the one or more SNs. The SN configuration preference may include a UE feedback preference that indicates a preference for the UE 120 to send layer 1 (L1) feedback (e.g., hybrid automatic repeat request (HARM) acknowledgement (ACK)/negative acknowledgment (NACK) feedback), or layer 2 (L2) feedback (e.g., radio link control (RLC)/PDCP status) for a communication received from an SN. Additionally, and/or alternatively, the SN configuration preference may include a UE feedback preference that indicates a preference for the UE 120 to send feedback (e.g., L1 feedback and/or L2 feedback), for a communication received from an SN, to that SN, or to the MN. The one or more UE feedback preferences may be specified as global preferences of the UE 120 for multiple SNs, as SN-specific preferences of the UE 120 for individual SNs, and/or a combination thereof.

As further shown in FIG. 6, and by reference number 610, the first base station 110-1 may transmit the assistance information to the second base station 110-2. In some aspects, the first base station 110-1 may be the MN and the second base station 110-2 may be an SN. In this case, the first base station 110-1 (MN) may transmit the assistance information received from the UE 120 to the second base station 110-2 and/or one or more other SN base stations.

In some aspects, the first base station 110-1 may be an SN and the second base station 110-2 may be the MN. In this case, the first base station 110-1 (SN) may transmit the assistance information received from the UE 120 to the second base station 110-2 (MN). The second base station 110-2 (MN) may then transmit the assistance information to one or more other SN base stations. Additionally, and/or alternatively, the first base station 110-1 (SN) may send the assistance information to the second base station 110-2 (MN) and one or more other SN base stations.

As further shown in FIG. 6, and by reference number 615, the first base station 110-1 and/or the second base station 110-2 may coordinate SN configuration for the UE 120 based at least in part on the assistance information.

In some aspects, the first base station 110-1 (e.g., MN or SN) and/or the second base station 110-2 (e.g., SN or MN) may determine an SN configuration or reconfiguration for the UE 120 based at least in part on the SN configuration preference included in the assistance information. For example, the first base station 110-1 (e.g., MN or SN) and/or the second base station 110-2 (e.g., SN or MN) may configure and/or modify the number of activated SNs and deactivated SNs for the UE 120, select which SNs are activated and which SNs are deactivated for the UE 120, and select which of the activated SNs are non-dormant and which of the activated SNs are dormant based at least in part on the SN configuration preference.

The first base station 110-1 (e.g., MN or SN) and/or the second base station 110-2 (e.g., SN or MN) may also configure the UE 120 to transmit L1 feedback or L2 feedback based at least in part on the one or more UE feedback preferences. Additionally, and/or alternatively, the first base station 110-1 (e.g., MN or SN) and/or the second base station 110-2 (e.g., SN or MN) may configure the UE 120 to transmit feedback (e.g., L1 feedback and/or L2 feedback), for a communication from an SN, to the SN or to the MN, based at least in part on the one or more UE feedback preferences. The first base station 110-1 (e.g., MN or SN) and/or the second base station 110-2 (e.g., SN or MN) may also modify the UE feedback settings based at least in part on the one or more UE feedback preferences.

As further shown in FIG. 6, and by reference number 620, the first base station 110-1 may transmit, to the UE 120, a communication indicating the SN configuration for the UE 120. For example, the communication may be an RRC communication, PDCCH DCI, a downlink MAC-CE, and/or a combination thereof.

In some aspects, the first base station 110-1 may transmit the communication to the UE 120 during a call setup, call resume, or handover. For example, the communication may be an RRC configuration and/or an RRC reconfiguration based at least in part on an RRC setup request, RRC resume request, and/or measurement report received from the UE 120. In some aspects, an RRC configuration/reconfiguration, transmitted from the first base station 110-1 to the UE 120, includes an SN configuration/reconfiguration based at least in part on the assistance information received from the UE 120. For example, the SN configuration/reconfiguration may indicate the number of activated SNs and deactivated SNs, indicate which SNs are activated and which SNs are deactivated, indicate which of the activated SNs are non-dormant and which of the activated SNs are dormant, and/or indicate one or more UE feedback settings for the UE 120.

In some aspects, the first base station 110-1 may transmit the communication during an ongoing call. For example, the communication may be at least one of a PDCCH DCI, a downlink MAC-CE, or an RRC reconfiguration transmitted from the first base station 110-1 to the UE 120 during an ongoing call. In some aspects, the communication may include an indication of a state change for at least one SN based at least in part on the SN configuration preference indicated in the assistance information. In some aspects, the communication may include an indication of a change to a UE feedback setting for the UE 120 based at least in part on the UE feedback preference included in the assistance information.

As further shown in FIG. 6, and by reference number 625, the UE 120 may receive portions of a PDCP sequence from the first base station 110-1 (e.g., MN or SN), the second base station 110-2 (e.g., SN or MN), and/or one or more other SN base stations. The UE 120 may receive portions of the PDCP sequence transmitted on the MCG associated with the MN and the SCG(s) associated with the activated (non-dormant) SN(s). The configuration of the activate SN(s) used to transmit portions of the PDCP sequence to the UE 120 may be determined based at least in part on the assistance information.

As described above, the UE 120 may transmit, to the base station 110, assistance information that indicates an SN configuration preference for multiple connectivity with an MN and one or more SNs. The first base station 110-1 (e.g., MN or SN) may coordinate with the second base station 110-2 (e.g., SN or MN) to determine an SN configuration for the UE 120 based at least in part on the assistance information. As a result, the SN configuration can be tailored to the preferences of the UE 120, which may increase throughput, decrease latency, and increase power conservation by the UE 120.

As indicated above, FIG. 6 is provided as an example. Other examples may differ from what is described with respect to FIG. 6.

Figure 7:
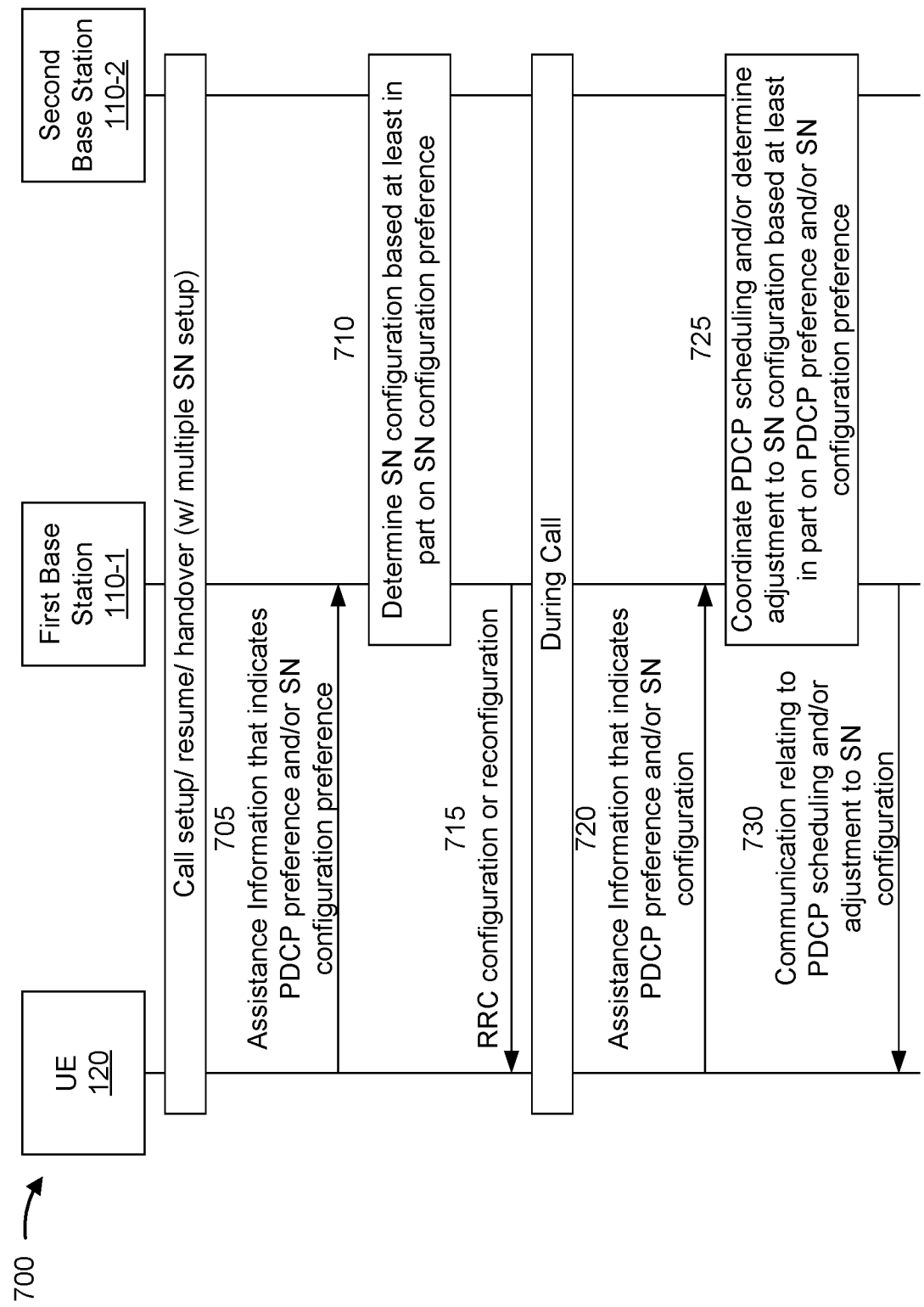
FIG. 7 is a diagram illustrating an example associated with UE assisted secondary node configuration and/or PDCP scheduling for multiple connectivity, in accordance with the present disclosure

FIG. 7 is a diagram illustrating an example 700 associated with UE assisted SN configuration and/or PDCP scheduling for multiple connectivity, in accordance with the present disclosure. As shown in FIG. 7, example 700 includes communication between a UE 120, a first base station 110-1, and a second base station 110-2. The base stations 110 and the UE 120 may be included in a wireless network, such as wireless network 100 illustrated and described above in connection with FIG. 1. The base stations 110 and the UE 120 may communicate on a wireless access link, which may include an uplink and a downlink.

As shown by reference number 705, during a call setup, a call resume, or a handover, the UE 120 may transmit, to the first base station 110-1, assistance information that indicates a PDCP preference and/or an SN configuration preference. For example, the assistance information may be included in an RRC setup request, an RRC resume request, or a measurement report (e.g., CSI report) for a call handover. Additionally, and/or alternatively, the assistance information may be included in an uplink MAC-CE transmitted during the call setup, call resume, or handover. The assistance information may include the PDCP preference, the SN configuration preference, and/or other UE-specific preferences relating to multiple connectivity for the UE 120, as described above in connection with FIG. 5.

As further shown in FIG. 7, and by reference number 710, the first base station 110-1 and/or the second base station 110-2 may determine an SN configuration for the UE 120 based at least in part on the SN configuration preference included in the assistance information. In some aspects, the first base station 110-1 may be the MN and the second base station 110-2 may be an SN.

In some aspects, the first base station 110-1 may be an SN and second base station 110-2 may be the MN. In some aspects, the first base station 110-1 may determine the SN configuration for the UE 120 based at least in part on the assistance information. In some aspects, the first base station 110-1 may transmit the assistance information to the base station, and second base station 110-2 may determine the SN configuration for the UE 120 based at least in part on the assistance information. In some aspects, the first base station 110-1 may coordinate with the second base station 110-2 to determine the assistance information.

The first base station 110-1 and/or the second base station 110-2 may determine a configuration of the number of activated SNs and the number of deactivated SNs for the UE 120 based at least in part on the SN configuration preference. The first base station 110-1 and/or the second base station 110-2 may determine a configuration of which SNs are activated and which SNs are deactivated for the UE 120 based at least in part on the SN configuration preference. The first base station 110-1 (and/or the second base station 110-2 may determine a configuration of which of the activated SNs are non-dormant and which of the activated SNs are dormant based at least in part on the SN configuration preference.

The first base station 110-1 and/or the second base station 110-2 may determine a configuration of a feedback mode for the UE 120 based on the one or more UE 120 feedback preferences included in the SN configuration preference. The first base station 110-1 and/or the second base station 110-2 may configure the UE 120 to transmit L1 feedback or L2 feedback based at least in part on the one or more UE feedback preferences. Additionally, and/or alternatively, first base station 110-1 and/or the second base station 110-2 may configure the UE 120 to transmit feedback (e.g., L1 feedback and/or L2 feedback) for a communication from an SN to the SN or to the MN, based at least in part on the one or more UE feedback preferences.

As further shown in FIG. 7, and by reference number 715, the first base station 110-1 may transmit, to the UE 120, an RRC configuration or RRC reconfiguration that includes the SN configuration for the UE 120. The SN configuration may indicate the number of activated SNs and deactivated SNs. The SN configuration may indicate which SNs are activated and which SNs are deactivated. The SN configuration may indicate which of the activated SNs are non-dormant and which of the activated SNs are dormant. The SN configuration may indicate an L1 feedback mode or an L2 feedback mode for the UE 120. The SN configuration may indicate whether feedback from the UE 120, for a communication from an SN, is to be transmitted to the SN or to the MN.

As further shown in FIG. 7, and by reference number 720, during an ongoing call, the UE 120 may transmit, to the first base station 110-1, assistance information that indicates a PDCP preference and/or an SN configuration preference. The assistance information may include the PDCP preference, the SN configuration preference, and/or other UE-specific preferences relating to multiple connectivity for the UE 120, as described above in connection with FIG. 5. In some aspects, the PDCP preference and/or the SN configuration preference included in the assistance information transmitted during the ongoing call may be based at least in part on the buffer size of the UE 120, the radio frequency variation of the UE 120, the QoS parameters for traffic associated with the UE 120, the power/battery consumption of the UE 120, the mobility of the UE 120, or a combination thereof.

As further shown in FIG. 7, and by reference number 725, the first base station 110-1 and/or the second base station 110-2 may coordinate PDCP scheduling and/or determine an adjustment to the SN configuration based at least in part on the PDCP preference and/or the SN configuration preference indicated in the assistance information.

In some aspects, the MN (e.g., the first base station 110-1 or the second base station 110-2) and SN(s) (e.g., the first base station 110-1 or the second base station 110-2, and/or one or more other base stations) may coordinate routing and/or scheduling of a PDCP sequence based at least in part on the PDCP preference and/or the SN configuration preference. The MN may coordinate with the SN(s) to determine routing of the PDCP sequence across the MN and the SN(s) to the UE 120 based at least in part on the PDCP preference and/or the SN configuration preference. For example, the MN may coordinate with the SN(s) to determine which portions of the PDCP sequence will be transmitted by the MN and the SN(s) based at least in part on the PDCP preference and/or the SN configuration preference. In some aspects, the MN or the SN may determine splitting and/or routing of the PDCP packages based at least in part on the PDCP splitting preference and/or the PDCP routing preference.

In some aspects, the MN may coordinate with the SN(s) to schedule transmission of the portions of the PDCP sequence by the MN and the SN(s) based at least in part on the PDCP preference. For example, the MN and the SN(s) may coordinate to schedule transmission of the portions of the PDCP sequence by the MN and SN(s) based at least in part on the PDCP sequence gap preference and/or the PDCP arrival time preference. The MN and/or SN(s) may adjust scheduled transmissions of one or more portions of the PDCP sequence to satisfy the PDCP sequence gap preference and/or the PDCP arrival time preference. For example, an offset may be added to delay transmission of a portion of the PDCP sequence by the MN or an SN to satisfy the PDCP sequence gap preference and/or the PDCP arrival time preference. In some aspects, the PDCP sequence gap preference and/or the PDCP arrival time preference may be included as an input for multiple connectivity scheduling by the MN and/or the SN(s).

In some aspects, the first base station 110-1 and/or the second base station 110-2 may determine an adjustment to one or more settings in the SN configuration based at least in part on the SN configuration preference transmitted by the UE 120 during the on-going call. For example, the first base station 110-1 and/or the second base station 110-2 may determine an adjustment to the number of activated SNs and/or the number of deactivated SNs for the UE 120, an adjustment to which SNs are activated and which SNs are deactivated, and/or an adjustment to which of the activated SNs are non-dormant and which of the activated SNs are dormant, based at least in part on the SN configuration preference. Additionally, and/or alternatively, the first base station 110-1 and/or the second base station 110-2 may determine an adjustment to a UE feedback setting based at least in part on the SN configuration preference.

As further shown in FIG. 7, and by reference number 730, the first base station 110-1 may transmit, to the UE 120, a communication relating to the PDCP scheduling and/or the adjustment to the SN configuration. For example, the communication may be at least one of PDCCH DCI, a downlink MAC-CE, or an RRC reconfiguration.

The communication may include an indication relating to PDCP scheduling for the UE 120. In some aspects, the communication may provide an indication of the routing of the PDCP sequence across the MN and the SN(s). In some aspects, the communication may include an indication relating to scheduling transmission, to the UE 120, of one or more portions of the PDCP sequence from the MN and SN(s) based at least in part on the PDCP sequence gap preference and/or the PDCP arrival time preference. For example, the communication may be a PDCCH communication that includes DCI for scheduling transmission of one or more portions of the PDCP from the MN or an SN. In some aspects, the communication may include at least one portion of the PDCP sequence scheduled based at least in part on the PDCP sequence gap preference and/or the PDCP arrival time preference.

In some aspects, the communication may include an indication of an adjustment to the SN configuration. For example, the communication may include an indication of a state change for at least one SN based at least in part on the SN configuration preference included in the assistance information transmitted by the UE 120 during the on-going call. Additionally, and/or alternatively, the communication may include an indication of a change to a UE feedback setting for the UE 120 based at least in part on the UE feedback preference included in the assistance information transmitted by the UE 120 during the on-going call.

As indicated above, FIG. 7 is provided as an example. Other examples may differ from what is described with respect to FIG. 7.

Figure 8:
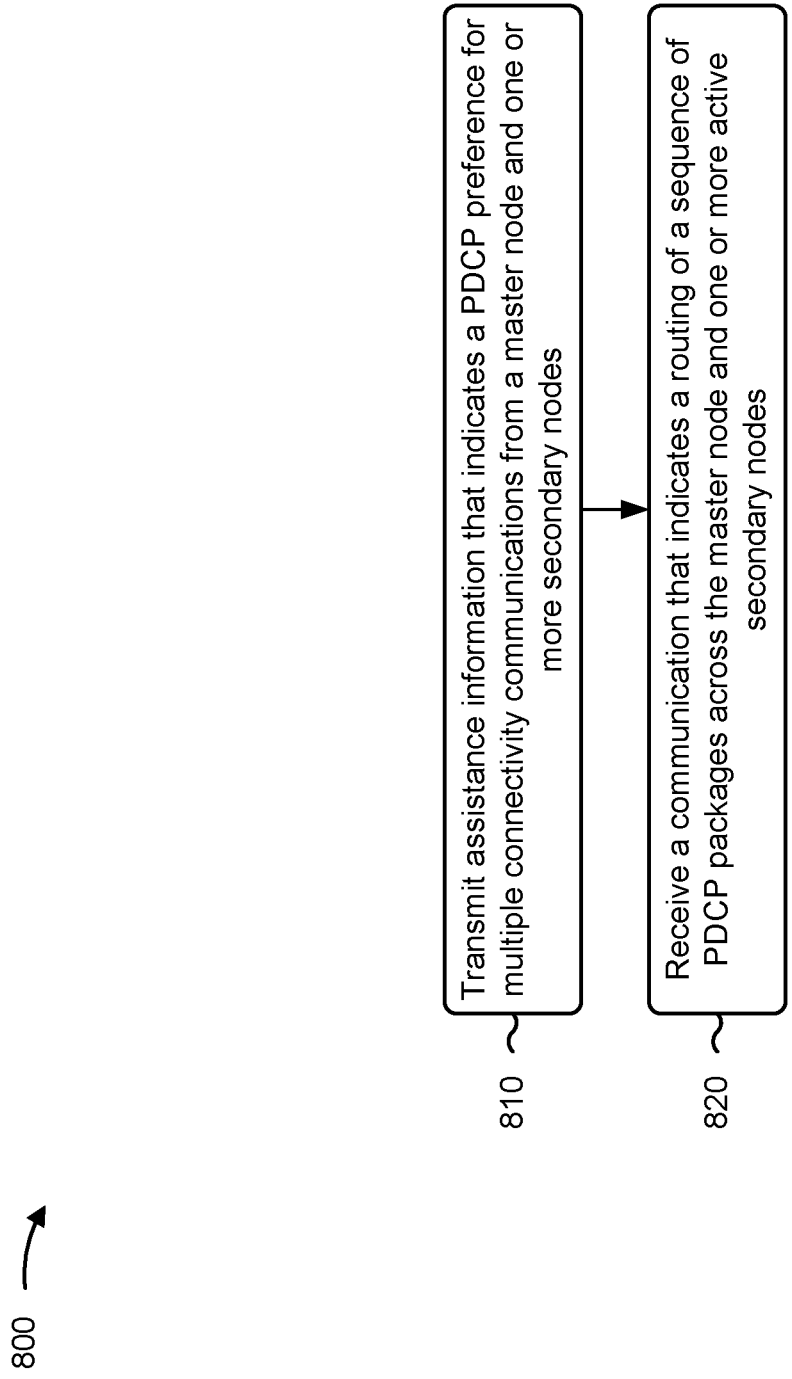
FIGS. 8 and 9 are diagrams illustrating example processes performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120) performs operations associated with UE assisted PDCP scheduling for multiple connectivity.

As shown in FIG. 8, in some aspects, process 800 may include transmitting, to a base station, assistance information that indicates a PDCP preference for multiple connectivity communications from a master node and one or more secondary nodes (block 810). For example, the UE (e.g., using antenna 252, transmit processor 264, TX MIMO processor 266, modem 254, controller/processor 280, and/or memory 282) may transmit, to a base station, assistance information that indicates a PDCP preference for multiple connectivity communications from a master node and one or more secondary nodes, as described above.

As further shown in FIG. 8, in some aspects, process 800 may include receiving, from the base station, a communication that indicates a routing of a sequence of PDCP packages across the master node and one or more active secondary nodes (block 820). For example, the UE (e.g., using antenna 252, modem 254, MIMO detector 256, receive processor 258, controller/processor 280, and/or memory 282) may receive, from the base station, a communication that indicates a sequence of PDCP packages across the master node and one or more active secondary nodes, as described above.

Process 800 may include additional aspects, such as any single aspect or any combination of aspects described below and/or in connection with one or more other processes described elsewhere herein.

In a first aspect, the base station is at least one of the master node or a secondary node of the one or more secondary nodes.

In a second aspect, alone or in combination with the first aspect, the PDCP preference includes a preference for a PDCP sequence gap for the PDCP packages transmitted by the master node and the one or more active secondary nodes.

In a third aspect, alone or in combination with one or more of the first and second aspects, the preference for the PDCP sequence gap includes at least one of a minimum PDCP sequence gap or a maximum PDCP sequence gap.

In a fourth aspect, alone or in combination with one or more of the first through third aspects, the preference for the PDCP sequence gap is based at least in part on a buffer size of the UE or latency parameters for traffic associated with the UE.

In a fifth aspect, alone or in combination with one or more of the first through fourth aspects, the PDCP preference includes a PDCP arrival time preference for the PDCP packages transmitted by the master node and the one or more active secondary nodes.

In a sixth aspect, alone or in combination with one or more of the first through fifth aspects, the PDCP arrival time preference indicates a preferred maximum time difference between arrivals of consecutive PDCP packages of the sequence of PDCP packages from the master node and the one or more active secondary nodes.

In a seventh aspect, alone or in combination with one or more of the first through sixth aspects, the PDCP arrival time preference is based at least in part on a buffer size of the UE or latency parameters for traffic associated with the UE.

In an eighth aspect, alone or in combination with one or more of the first through seventh aspects, the PDCP preference includes at least one of a PDCP splitting preference that specifies a preference for the master node or one of the active secondary nodes to perform splitting of the sequence of PDCP packages, or a PDCP routing preference that specifies a preference for the master node or one of the active secondary nodes to perform routing of the sequence of PDCP packages.

In a ninth aspect, alone or in combination with one or more of the first through eighth aspects, the assistance information is included in at least one of a radio resource control communication, a MAC-CE, or a channel status information report.

In a tenth aspect, alone or in combination with one or more of the first through ninth aspects, the communication is at least one of a radio resource control communication, physical downlink control channel downlink control information, or a MAC-CE.

In an eleventh aspect, alone or in combination with one or more of the first through tenth aspects, the assistance information is included in at least one of a call setup request, a call resume request, or a measurement report for a call handover.

In a twelfth aspect, alone or in combination with one or more of the first through eleventh aspects, the assistance information is transmitted to the base station during an ongoing call.

In a thirteenth aspect, alone or in combination with one or more of the first through twelfth aspects, the PDCP preference includes at least one of a PDCP sequence gap preference or a PDCP arrival time preference, and the communication includes an indication relating to scheduling delivery of the sequence of PDCP packages based at least in part on the at least one of the PDCP sequence gap preference or the PDCP arrival time preference.

In a fourteenth aspect, alone or in combination with one or more of the first through thirteenth aspects, the PDCP preference includes at least one of a PDCP sequence gap preference or a PDCP arrival time preference, and the communication includes at least one PDCP package of a sequence of PDCP packages scheduled based at least in part on the at least one of the PDCP sequence gap preference or the PDCP arrival time preference.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
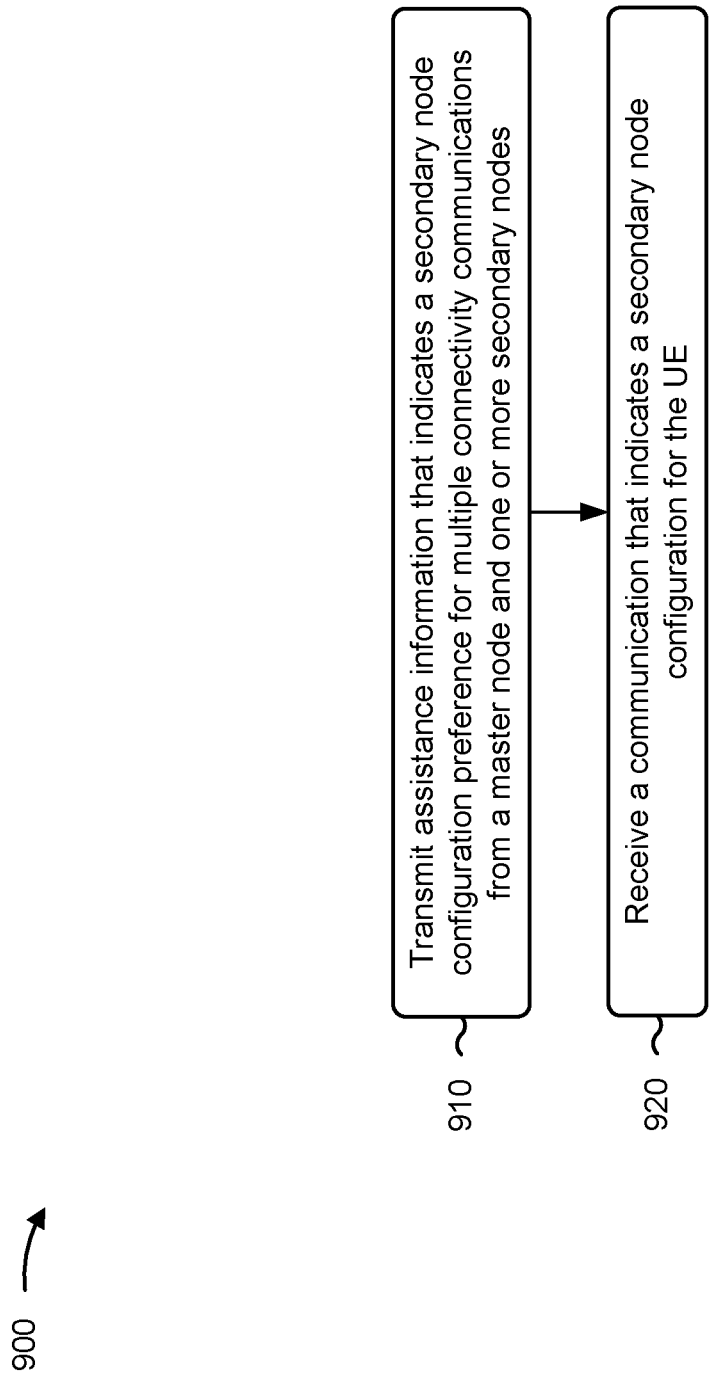

FIG. 9 is a diagram illustrating an example process 900 performed, for example, by a UE, in accordance with the present disclosure. Example process 900 is an example where the UE (e.g., UE 120) performs operations associated with UE assisted secondary node configuration for multiple connectivity.

As shown in FIG. 9, in some aspects, process 900 may include transmitting, to a base station, assistance information that indicates a secondary node configuration preference for multiple connectivity communications from a master node and one or more secondary nodes (block 910). For example, the UE (e.g., using antenna 252, transmit processor 264, TX MIMO processor 266, modem 254, controller/processor 280, and/or memory 282) may transmit, to a base station, assistance information that indicates a secondary node configuration preference for multiple connectivity communications from a master node and one or more secondary nodes, as described above.

As further shown in FIG. 9, in some aspects, process 900 may include receiving, from the base station, a communication that indicates a secondary node configuration for the UE (block 920). For example, the UE (e.g., using antenna 252, modem 254, MIMO detector 256, receive processor 258, controller/processor 280, and/or memory 282) may receive, from the base station, a communication that indicates a secondary node configuration for the UE, as described above.

Process 900 may include additional aspects, such as any single aspect or any combination of aspects described below and/or in connection with one or more other processes described elsewhere herein.

In a first aspect, the base station is at least one of the master node or a secondary node of the one or more secondary nodes.

In a second aspect, alone or in combination with the first aspect, the secondary node configuration preference includes at least one of a preferred number of activated secondary nodes or a preferred number of deactivated secondary nodes.

In a third aspect, alone or in combination with one or more of the first and second aspects, the secondary node configuration preference includes at least one of a preferred set of activated secondary nodes of the one or more secondary nodes or a preferred set of deactivated secondary nodes of the one or more secondary nodes.

In a fourth aspect, alone or in combination with one or more of the first through third aspects, the secondary node configuration preference includes at least one of a preferred set of non-dormant activated secondary nodes of the one or more secondary nodes or a preferred set of dormant activated secondary nodes of the one or more secondary nodes.

In a fifth aspect, alone or in combination with one or more of the first through fourth aspects, the secondary node configuration preference includes a UE feedback preference for the one or more secondary nodes.

In a sixth aspect, alone or in combination with one or more of the first through fifth aspects, the UE feedback preference indicates a preference for layer 1 feedback or layer 2 feedback from the UE for communications received from the one or more secondary nodes.

In a seventh aspect, alone or in combination with one or more of the first through sixth aspects, the UE feedback preference indicates a preference to send feedback for communications received from the one or more secondary nodes to the one or more secondary nodes or a preference to send feedback for communications received from the one or more secondary nodes to the master node.

In an eighth aspect, alone or in combination with one or more of the first through seventh aspects, the assistance information is included in at least one of a radio resource control communication, a MAC-CE, or a channel status information report.

In a ninth aspect, alone or in combination with one or more of the first through eighth aspects, the communication is at least one of a radio resource control communication, physical downlink control channel downlink control information, or a MAC-CE.

In a tenth aspect, alone or in combination with one or more of the first through ninth aspects, the assistance information is included in at least one of a call setup request, a call resume request, or a measurement report for a call handover.

In an eleventh aspect, alone or in combination with one or more of the first through tenth aspects, the communication includes the secondary node configuration, and the secondary node configuration specifies at least one of a configuration of the one or more secondary nodes for multiple connectivity communications or a re-configuration of the one or more secondary nodes for multiple connectivity communications.

In a twelfth aspect, alone or in combination with one or more of the first through eleventh aspects, the assistance information is transmitted to the base station during an ongoing call.

In a thirteenth aspect, alone or in combination with one or more of the first through twelfth aspects, the communication includes an indication of a state change for at least one secondary node of the one or more secondary nodes.

In a fourteenth aspect, alone or in combination with one or more of the first through thirteenth aspects, the secondary node configuration preference includes a UE feedback preference, and the communication includes an indication of a change to a feedback mode for the UE based at least in part on the UE feedback preference.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
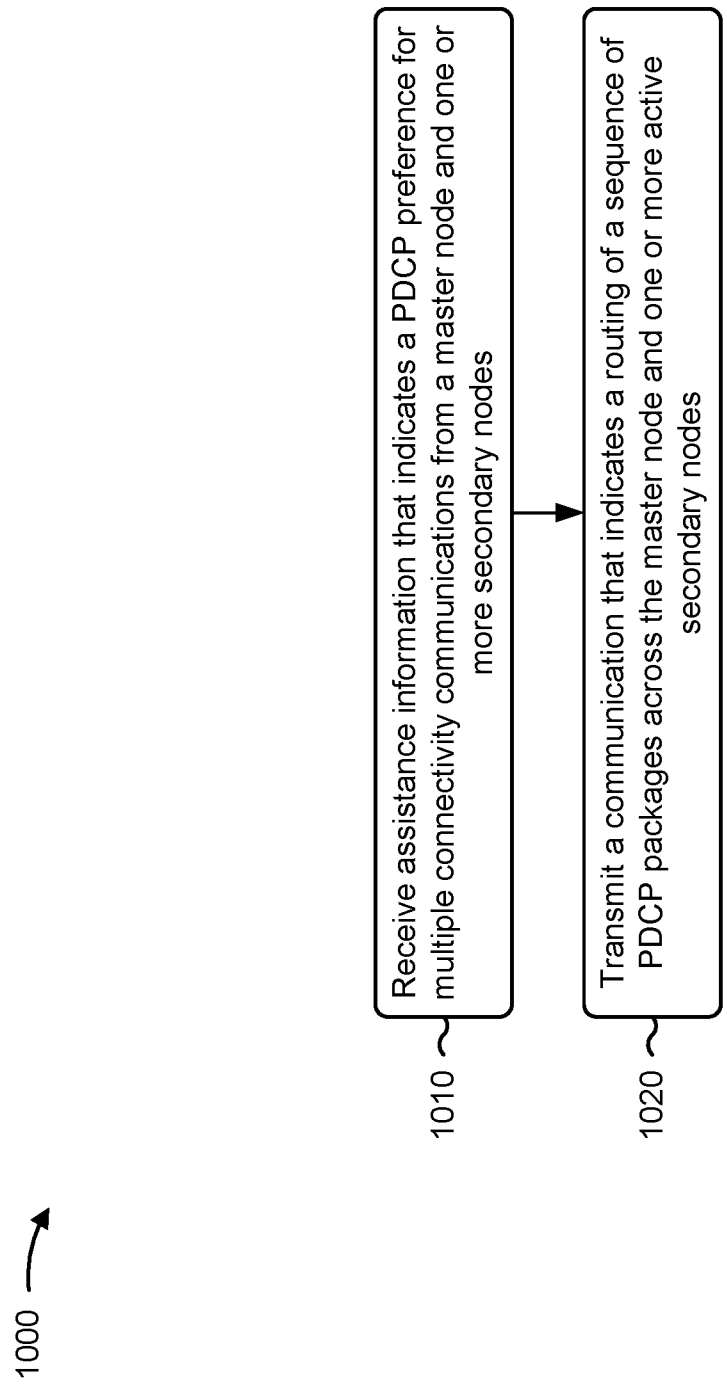
FIGS. 10 and 11 are diagrams illustrating example processes performed, for example, by a base station, in accordance with the present disclosure.

FIG. 10 is a diagram illustrating an example process 1000 performed, for example, by a base station, in accordance with the present disclosure. Example process 1000 is an example where the base station (e.g., base station 110) performs operations associated with UE assisted PDCP scheduling for multiple connectivity.

As shown in FIG. 10, in some aspects, process 1000 may include receiving, from a UE, assistance information that indicates a PDCP preference for multiple connectivity communications from a master node and one or more secondary nodes (block 1010). For example, the base station (e.g., using antenna 234, modem 232, MIMO detector 236, receive processor 238, controller/processor 240, and/or memory 242) may receive, from a UE, assistance information that indicates a PDCP preference for multiple connectivity communications from a master node and one or more secondary nodes, as described above.

As further shown in FIG. 10, in some aspects, process 1000 may include transmitting, to the UE, a communication that indicates a routing of a sequence of PDCP packages across the master node and one or more active secondary nodes (block 1020). For example, the base station (e.g., using transmit processor 220, TX MIMO processor 230, modulator 232, antenna 234, controller/processor 240, memory 242, and/or scheduler 246) may transmit, to the UE, a communication that indicates a routing of a sequence of PDCP packages across the master node and one or more active secondary nodes, as described above.

Process 1000 may include additional aspects, such as any single aspect or any combination of aspects described below and/or in connection with one or more other processes described elsewhere herein.

In a first aspect, process 1000 includes coordinating scheduling of multiple connectivity communications to the UE with one or more other base stations based at least in part on the PDCP preference.

In a second aspect, alone or in combination with the first aspect, the PDCP preference includes at least one of a PDCP sequence gap preference or a PDCP arrival time preference, and coordinating scheduling of multiple connectivity communications to the UE with the one or more other base stations comprises coordinating scheduling of delivery of the PDCP sequence to the UE with the one or more other base stations based at least in part on the at least one of the PDCP sequence gap preference or the PDCP arrival time preference.

In a third aspect, alone or in combination with one or more of the first and second aspects, the base station is at least one of the master node or a secondary node of the one or more secondary nodes.

In a fourth aspect, alone or in combination with one or more of the first through third aspects, the PDCP preference includes a preference for a PDCP sequence gap for the PDCP packages transmitted by the master node and the one or more active secondary nodes.

In a fifth aspect, alone or in combination with one or more of the first through fourth aspects, the preference for the PDCP sequence gap includes at least one of a minimum PDCP sequence gap or a maximum PDCP sequence gap.

In a sixth aspect, alone or in combination with one or more of the first through fifth aspects, the preference for the PDCP sequence gap is based at least in part on a buffer size of the UE or latency parameters for traffic associated with the UE.

In a seventh aspect, alone or in combination with one or more of the first through sixth aspects, the PDCP preference includes a PDCP arrival time preference for the PDCP packages transmitted by the master node and the one or more active secondary nodes.

In an eighth aspect, alone or in combination with one or more of the first through seventh aspects, the PDCP arrival time preference indicates a preferred maximum time difference between arrivals of consecutive PDCP packages of the sequence of PDCP packages from the master node and the one or more active secondary nodes.

In a ninth aspect, alone or in combination with one or more of the first through eighth aspects, the PDCP arrival time preference is based at least in part on a buffer size of the UE or latency parameters for traffic associated with the UE.

In an tenth aspect, alone or in combination with one or more of the first through ninth aspects, the PDCP preference includes at least one of a PDCP splitting preference that specifies a preference for the master node or one of the active secondary nodes to perform splitting of the sequence of PDCP packages, or a PDCP routing preference that specifies a preference for the master node or one of the active secondary nodes to perform routing of the sequence of PDCP packages.

In an eleventh aspect, alone or in combination with one or more of the first through tenth aspects, the assistance information is included in at least one of a radio resource control communication, a medium access control (MAC) control element, or a channel status information report.

In a twelfth aspect, alone or in combination with one or more of the first through eleventh aspects, the communication is at least one of a radio resource control communication, physical downlink control channel downlink control information, or a MAC-CE.

In a thirteenth aspect, alone or in combination with one or more of the first through twelfth aspects, the assistance information is included in at least one of a call setup request, a call resume request, or a measurement report for a call handover.

In a fourteenth aspect, alone or in combination with one or more of the first through thirteenth aspects, the assistance information is received by the base station during an ongoing call.

In a fifteenth aspect, alone or in combination with one or more of the first through fourteenth aspects, the PDCP preference includes at least one of a PDCP sequence gap preference or a PDCP arrival time preference, and the communication includes an indication relating to scheduling delivery of the sequence of PDCP packages based at least in part on the at least one of the PDCP sequence gap preference or the PDCP arrival time preference.

In a sixteenth aspect, alone or in combination with one or more of the first through fifteenth aspects, the PDCP preference includes at least one of a PDCP sequence gap preference or a PDCP arrival time preference, and the communication includes at least one PDCP package of the sequence of PDCP packages scheduled based at least in part on the at least one of the PDCP sequence gap preference or the PDCP arrival time preference.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
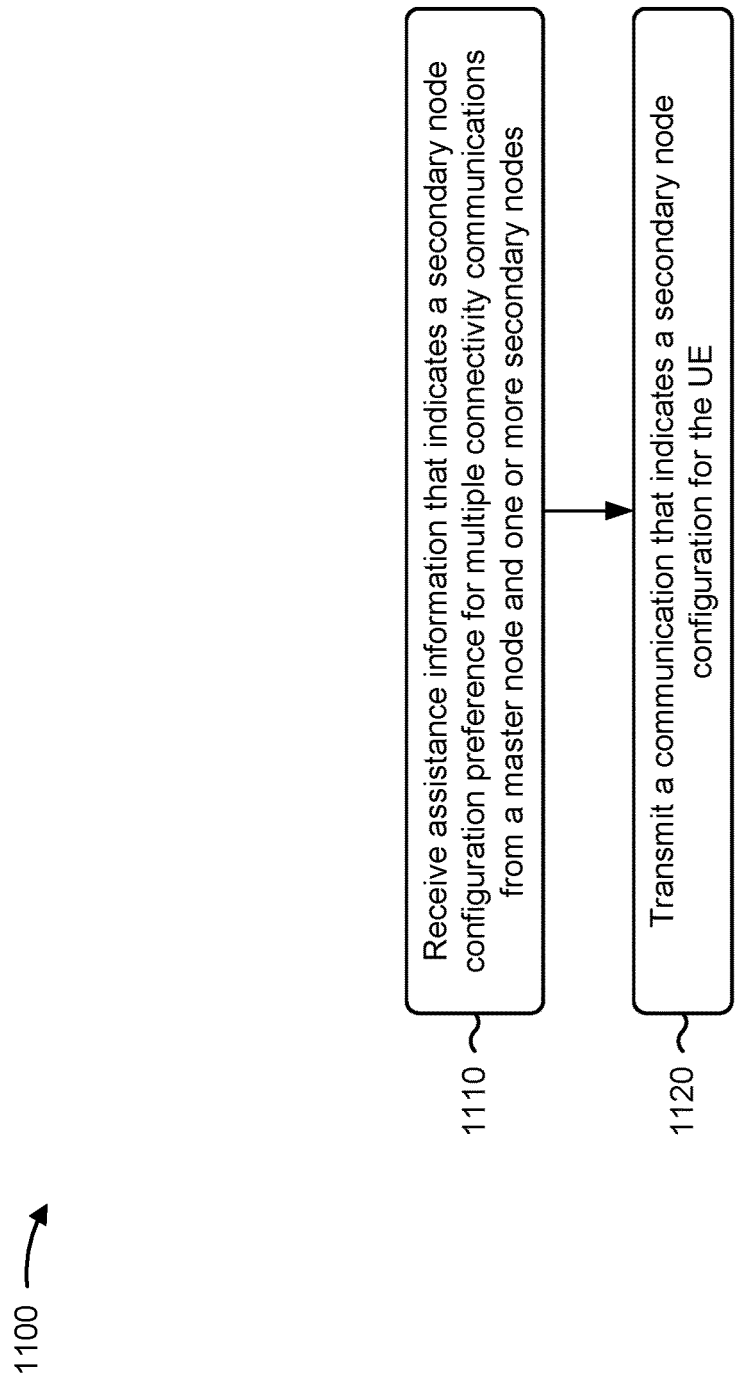

FIG. 11 is a diagram illustrating an example process 1100 performed, for example, by a base station, in accordance with the present disclosure. Example process 1100 is an example where the base station (e.g., base station 110) performs operations associated with UE assisted secondary node configuration.

As shown in FIG. 11, in some aspects, process 1100 may include receiving, from a UE, assistance information that indicates a secondary node configuration preference for multiple connectivity communications from a master node and one or more secondary nodes (block 1110). For example, the base station (e.g., using antenna 234, demodulator 232, MIMO detector 236, receive processor 238, controller/processor 240, and/or memory 242) may receive, from a UE, assistance information that indicates a secondary node configuration preference for multiple connectivity communications from a master node and one or more secondary nodes, as described above.

As further shown in FIG. 11, in some aspects, process 1100 may include transmitting, to the UE, a communication that indicates a secondary node configuration for the UE (block 1120). For example, the base station (e.g., using transmit processor 220, TX MIMO processor 230, modulator 232, antenna 234, controller/processor 240, memory 242, and/or scheduler 246) may transmit, to the UE, a communication that indicates a secondary node configuration for the UE, as described above.

Process 1100 may include additional aspects, such as any single aspect or any combination of aspects described below and/or in connection with one or more other processes described elsewhere herein.

In a first aspect, process 1100 includes coordinating scheduling of multiple connectivity communications to the UE with one or more other base stations based at least in part on the secondary node configuration preference.

In a second aspect, alone or in combination with the first aspect, the base station is at least one of the master node or a secondary node of the one or more secondary nodes.

In a third aspect, alone or in combination with one or more of the first and second aspects, the secondary node configuration preference includes at least one of a preferred number of activated secondary nodes or a preferred number of deactivated secondary nodes.

In a fourth aspect, alone or in combination with one or more of the first through third aspects, the secondary node configuration preference includes at least one of a preferred set of activated secondary nodes of the one or more secondary nodes or a preferred set of deactivated secondary nodes of the one or more secondary nodes.

In a fifth aspect, alone or in combination with one or more of the first through fourth aspects, the secondary node configuration preference includes at least one of a preferred set of non-dormant activated secondary nodes of the one or more secondary nodes or a preferred set of dormant activated secondary nodes of the one or more secondary nodes.

In a sixth aspect, alone or in combination with one or more of the first through fifth aspects, the secondary node configuration preference includes a UE feedback preference for the one or more secondary nodes.

In a seventh aspect, alone or in combination with one or more of the first through sixth aspects, the UE feedback preference indicates a preference for layer 1 feedback or layer 2 feedback from the UE for communications received from the one or more secondary nodes.

In an eighth aspect, alone or in combination with one or more of the first through seventh aspects, the UE feedback preference indicates a preference to send feedback for communications received from the one or more secondary nodes to the one or more secondary nodes or a preference to send feedback for communications received from the one or more secondary nodes to the master node.

In a ninth aspect, alone or in combination with one or more of the first through eighth aspects, the assistance information is included in at least one of a radio resource control communication, a MAC-CE, or a channel status information report.

In a tenth aspect, alone or in combination with one or more of the first through ninth aspects, the communication is at least one of a radio resource control communication, physical downlink control channel downlink control information, or a MAC-CE.

In an eleventh aspect, alone or in combination with one or more of the first through tenth aspects, the assistance information is included in at least one of a call setup request, a call resume request, or a measurement report for a call handover.

In a twelfth aspect, alone or in combination with one or more of the first through eleventh aspects, the communication includes the secondary node configuration, and the secondary node configuration specifies at least one of a configuration of the one or more secondary nodes for multiple connectivity communications or a re-configuration of the one or more secondary nodes for multiple connectivity communications.

In a thirteenth aspect, alone or in combination with one or more of the first through twelfth aspects, the assistance information is received by the base station during an ongoing call.

In a fourteenth aspect, alone or in combination with one or more of the first through thirteenth aspects, the communication includes an indication of a state change for at least one secondary node of the one or more secondary nodes.

In a fifteenth aspect, alone or in combination with one or more of the first through fourteenth aspects, the secondary node configuration preference includes a UE feedback preference, and the communication includes an indication of a change to a feedback mode for the UE based at least in part on the UE feedback preference.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The following provides an overview of some Aspects of the present disclosure:

Aspect 1: A method of wireless communication performed by a user equipment (UE), comprising: transmitting, to a base station, assistance information that indicates a packet data convergence protocol (PDCP) preference for multiple connectivity communications from a master node and one or more secondary nodes; and receiving, from the base station, a communication that indicates a routing of a sequence of PDCP packages across the master node and one or more active secondary nodes.

Aspect 2: The method of Aspect 1, wherein the base station is at least one of the master node or a secondary node of the one or more secondary nodes.

Aspect 3: The method of any of Aspects 1-2, wherein the PDCP preference includes a preference for a PDCP sequence gap for the PDCP packages transmitted by the master node and the one or more active secondary nodes.

Aspect 4: The method of Aspect 3, wherein the preference for the PDCP sequence gap includes at least one of a minimum PDCP sequence gap or a maximum PDCP sequence gap.

Aspect 5: The method of any of Aspects 3-4, wherein the preference for the PDCP sequence gap is based at least in part on a buffer size of the UE or latency parameters for traffic associated with the UE.

Aspect 6: The method of any of Aspects 1-5, wherein the PDCP preference includes a PDCP arrival time preference for the PDCP packages transmitted by the master node and the one or more active secondary nodes.

Aspect 7: The method of Aspect 6, wherein the PDCP arrival time preference indicates a preferred maximum time difference between arrivals of consecutive PDCP packages of the sequence of PDCP packages from the master node and the one or more active secondary nodes.

Aspect 8: The method of any of Aspects 6-7, wherein the PDCP arrival time preference is based at least in part on a buffer size of the UE or latency parameters for traffic associated with the UE.

Aspect 9: The method of any of Aspects 1-8, wherein the PDCP preference includes at least one of a PDCP splitting preference that specifies a preference for the master node or one of the active secondary nodes to perform splitting of the sequence of PDCP packages, or a PDCP routing preference that specifies a preference for the master node or one of the active secondary nodes to perform routing of the sequence of PDCP packages.

Aspect 10: The method of any of Aspects 1-9, wherein the assistance information is included in at least one of a radio resource control communication, a medium access control (MAC) control element, or a channel status information report.

Aspect 11: The method of any of Aspects 1-10, wherein the communication is at least one of a radio resource control communication, physical downlink control channel downlink control information, or a medium access control (MAC) control element.

Aspect 12: The method of any of Aspects 1-11, wherein the assistance information is included in at least one of a call setup request, a call resume request, or a measurement report for a call handover.

Aspect 13: The method of any of Aspects 1-12, wherein the assistance information is transmitted to the base station during an ongoing call.

Aspect 14: The method of any of Aspects 13, wherein the PDCP preference includes at least one of a PDCP sequence gap preference or a PDCP arrival time preference, and the communication includes an indication relating to scheduling delivery of the sequence of PDCP packages based at least in part on the at least one of the PDCP sequence gap preference or the PDCP arrival time preference.

Aspect 15: The method of any of Aspects 13-14, wherein the PDCP preference includes at least one of a PDCP sequence gap preference or a PDCP arrival time preference, and the communication includes at least one PDCP package of a sequence of PDCP packages scheduled based at least in part on the at least one of the PDCP sequence gap preference or the PDCP arrival time preference.

Aspect 16: A method of wireless communication performed by a base station, comprising: receiving, from a user equipment (UE), assistance information that indicates a packet data convergence protocol (PDCP) preference for multiple connectivity communications from a master node and one or more secondary nodes; and transmitting, to the UE, a communication that indicates a routing of a sequence of PDCP packages across the master node and one or more active secondary nodes.

Aspect 17: The method of Aspect 16, further comprising: coordinating scheduling of multiple connectivity communications to the UE with one or more other base stations based at least in part on the PDCP preference.

Aspect 18: The method of Aspect 17, wherein coordinating scheduling of multiple connectivity communications to the UE with the one or more other base stations comprises coordinating scheduling of delivery of the PDCP sequence to the UE with the one or more other base stations based at least in part on the at least one of the PDCP sequence gap preference or the PDCP arrival time preference.

Aspect 19: The method of any of Aspects 16-18, wherein the base station is at least one of the master node or a secondary node of the one or more secondary nodes.

Aspect 20: The method of any of Aspects 16-19, wherein the PDCP preference includes a preference for a PDCP sequence gap for the PDCP packages transmitted by the master node and the one or more active secondary nodes.

Aspect 21: The method of Aspect 20, wherein the preference for the PDCP sequence gap includes at least one of a minimum PDCP sequence gap or a maximum PDCP sequence gap.

Aspect 22: The method of any of Aspects 20-21, wherein the preference for the PDCP sequence gap is based at least in part on a buffer size of the UE or latency parameters for traffic associated with the UE.

Aspect 23: The method of any of Aspects 16-22, wherein the PDCP preference includes a PDCP arrival time preference for the PDCP packages transmitted by the master node and the one or more active secondary nodes.

Aspect 24: The method of Aspect 23, wherein the PDCP arrival time preference indicates a preferred maximum time difference between arrivals of consecutive PDCP packages of the sequence of PDCP packages from the master node and the one or more active secondary nodes.

Aspect 25: The method of any of Aspects 23-24, wherein the PDCP arrival time preference is based at least in part on a buffer size of the UE or latency parameters for traffic associated with the UE.

Aspect 26: The method of any of Aspects 16-25, wherein the PDCP preference includes at least one of a PDCP splitting preference that specifies a preference for the master node or one of the active secondary nodes to perform splitting of the sequence of PDCP packages, or a PDCP routing preference that specifies a preference for the master node or one of the active secondary nodes to perform routing of the sequence of PDCP packages.

Aspect 27: The method of any of Aspects 16-26, wherein the assistance information is included in at least one of a radio resource control communication, a medium access control (MAC) control element, or a channel status information report.

Aspect 28: The method of any of Aspects 16-27, wherein the communication is at least one of a radio resource control communication, physical downlink control channel downlink control information, or a medium access control (MAC) control element.

Aspect 29: The method of any of Aspects 16-28, wherein the assistance information is included in at least one of a call setup request, a call resume request, or a measurement report for a call handover.

Aspect 30: The method of any of Aspects 16-29, wherein the assistance information is received by the base station during an ongoing call.

Aspect 31: The method of any of Aspects 30, wherein the PDCP preference includes at least one of a PDCP sequence gap preference or a PDCP arrival time preference, and the communication includes an indication relating to scheduling delivery of the sequence of PDCP packages based at least in part on the at least one of the PDCP sequence gap preference or the PDCP arrival time preference.

Aspect 32: The method of any of Aspects 30-31, wherein the PDCP preference includes at least one of a PDCP sequence gap preference or a PDCP arrival time preference, and the communication includes at least one PDCP package of the sequence of PDCP packages scheduled based at least in part on the at least one of the PDCP sequence gap preference or the PDCP arrival time preference.

Aspect 33: A method of wireless communication performed by a user equipment (UE), comprising: transmitting, to a base station, assistance information that indicates a secondary node configuration preference for multiple connectivity communications from a master node and one or more secondary nodes; and receiving, from the base station, a communication that indicates a secondary node for the UE.

Aspect 34: The method of Aspect 33, wherein the base station is at least one of the master node or a secondary node of the one or more secondary nodes.

Aspect 35: The method of any of Aspects 33-34, wherein the secondary node configuration preference includes at least one of a preferred number of activated secondary nodes or a preferred number of deactivated secondary nodes.

Aspect 36: The method of any of Aspects 33-36, wherein the secondary node configuration preference includes at least one of a preferred set of activated secondary nodes of the one or more secondary nodes or a preferred set of deactivated secondary nodes of the one or more secondary nodes.

Aspect 37: The method of any of Aspects 33-36, wherein the secondary node configuration preference includes at least one of a preferred set of non-dormant activated secondary nodes of the one or more secondary nodes or a preferred set of dormant activated secondary nodes of the one or more secondary nodes.

Aspect 38: The method of any of Aspects 33-37, wherein the secondary node configuration preference includes a UE feedback preference for the one or more secondary nodes.

Aspect 39: The method of Aspect 38, wherein the UE feedback preference indicates a preference for layer 1 feedback or layer 2 feedback from the UE for communications received from the one or more secondary nodes.

Aspect 40: The method of any of Aspects 38-39, wherein the UE feedback preference indicates a preference to send feedback for communications received from the one or more secondary nodes to the one or more secondary nodes or a preference to send feedback for communications received from the one or more secondary nodes to the master node.

Aspect 41: The method of any of Aspects 33-40, wherein the assistance information is included in at least one of a radio resource control communication, a medium access control (MAC) control element, or a channel status information report.

Aspect 42: The method of any of Aspects 33-41, wherein the communication is at least one of a radio resource control communication, physical downlink control channel downlink control information, or a medium access control (MAC) control element.

Aspect 43: The method of any of Aspects 33-42, wherein the assistance information is included in at least one of a call setup request, a call resume request, or a measurement report for a call handover.

Aspect 44: The method of Aspect 43, wherein the secondary node configuration specifies at least one of a configuration of the one or more secondary nodes for multiple connectivity communications or a re-configuration of the one or more secondary nodes for multiple connectivity communications.

Aspect 45: The method of any of Aspects 33-44, wherein the assistance information is transmitted to the base station during an ongoing call.

Aspect 46: The method of Aspect 45, wherein the communication includes an indication of a state change for at least one secondary node of the one or more secondary nodes.

Aspect 47: The method of any of Aspects 45-46, wherein the secondary node configuration preference includes a UE feedback preference, and the communication includes an indication of a change to a feedback mode for the UE based at least in part on the UE feedback preference.

Aspect 48: A method of wireless communication performed by a base station, comprising: receiving, from a user equipment (UE), assistance information that indicates a secondary node configuration preference for multiple connectivity communications from a master node and one or more secondary nodes; and transmitting, to the UE, a communication that indicates a secondary node configuration for the UE.

Aspect 49: The method of Aspect 48, further comprising: coordinating scheduling of multiple connectivity communications to the UE with one or more other base stations based at least in part on the secondary node configuration preference.

Aspect 50: The method of any of Aspects 48-49, wherein the base station is at least one of the master node or a secondary node of the one or more secondary nodes.

Aspect 51: The method of any of Aspects 48-50, wherein the secondary node configuration preference includes at least one of a preferred number of activated secondary nodes or a preferred number of deactivated secondary nodes.

Aspect 52: The method of any of Aspects 48-51, wherein the secondary node configuration preference includes at least one of a preferred set of activated secondary nodes of the one or more secondary nodes or a preferred set of deactivated secondary nodes of the one or more secondary nodes.

Aspect 53: The method of any of Aspects 48-52, wherein the secondary node configuration preference includes at least one of a preferred set of non-dormant activated secondary nodes of the one or more secondary nodes or a preferred set of dormant activated secondary nodes of the one or more secondary nodes.

Aspect 54: The method of any of Aspects 48-53, wherein the secondary node configuration preference includes a UE feedback preference for the one or more secondary nodes.

Aspect 55: The method of Aspect 54, wherein the UE feedback preference indicates a preference for layer 1 feedback or layer 2 feedback from the UE for communications received from the one or more secondary nodes.

Aspect 56: The method of any of Aspects 54-55, wherein the UE feedback preference indicates a preference to send feedback for communications received from the one or more secondary nodes to the one or more secondary nodes or a preference to send feedback for communications received from the one or more secondary nodes to the master node.

Aspect 57: The method of any of Aspects 48-56, wherein the assistance information is included in at least one of a radio resource control communication, a medium access control (MAC) control element, or a channel status information report.

Aspect 58: The method of any of Aspects 48-57, wherein the communication is at least one of a radio resource control communication, physical downlink control channel downlink control information, or a medium access control (MAC) control element.

Aspect 59: The method of any of Aspects 48-58, wherein the assistance information is included in at least one of a call setup request, a call resume request, or a measurement report for a call handover.

Aspect 60: The method of Aspect 59, wherein the communication includes the secondary node configuration, and the secondary node configuration specifies at least one of a configuration of the one or more secondary nodes for multiple connectivity communications or a re-configuration of the one or more secondary nodes for multiple connectivity communications.

Aspect 61: The method of any of Aspects 48-60, wherein the assistance information is received by the base station during an ongoing call.

Aspect 62: The method of Aspect 61, wherein the communication includes an indication of a state change for at least one secondary node of the one or more secondary nodes.

Aspect 63: The method of any of Aspects 61-62, wherein the secondary node configuration preference includes a UE feedback preference, and the communication includes an indication of a change to a feedback mode for the UE based at least in part on the UE feedback preference.

Aspect 64: A method of wireless communication performed by a user equipment (UE), comprising: transmitting, to a base station, assistance information that indicates at least one of a packet data convergence protocol (PDCP) preference or a secondary node configuration preference for multiple connectivity communications from a master node and one or more secondary nodes; and receiving, from the base station, a communication that indicates at least one of a secondary node configuration or a routing of a sequence of PDCP packages across the master node and one or more active secondary nodes.

Aspect 65: The method of Aspect 64, wherein the base station is at least one of the master node or a secondary node of the one or more secondary nodes.

Aspect 66: The method of any of Aspects 64-65, wherein the assistance information includes the PDCP preference.

Aspect 67: The method of Aspect 66, wherein the PDCP preference includes a preference for a PDCP sequence gap for the PDCP packages transmitted by the master node and the one or more active secondary nodes.

Aspect 68: The method of Aspect 67, wherein the preference for the PDCP sequence gap includes at least one of a minimum PDCP sequence gap or a maximum PDCP sequence gap.

Aspect 69: The method of any of Aspects 67-68, wherein the preference for the PDCP sequence gap is based at least in part on a buffer size of the UE or latency parameters for traffic associated with the UE.

Aspect 70: The method of any of Aspects 66-69, wherein the PDCP preference includes a PDCP arrival time preference for the PDCP packages transmitted by the master node and the one or more active secondary nodes.

Aspect 71: The method of Aspect 70, wherein the PDCP arrival time preference indicates a preferred maximum time difference between arrivals of consecutive PDCP packages of the sequence of PDCP packages from the master node and the one or more active secondary nodes.

Aspect 72: The method of any of Aspects 70-71, wherein the PDCP arrival time preference is based at least in part on a buffer size of the UE or latency parameters for traffic associated with the UE.

Aspect 73: The method of any of Aspects 66-72, wherein the PDCP preference includes at least one of a PDCP splitting preference that specifies a preference for the master node or one of the active secondary nodes to perform splitting of the sequence of PDCP packages, or a PDCP routing preference that specifies a preference for the master node or one of the active secondary nodes to perform routing of the sequence of PDCP packages.

Aspect 74: The method of any of Aspects 64-73, wherein the assistance information includes the secondary node configuration preference.

Aspect 75: The method of Aspect 74, wherein the secondary node configuration preference includes at least one of a preferred number of activated secondary nodes or a preferred number of deactivated secondary nodes.

Aspect 76: The method of any of Aspects 74-75, wherein the secondary node configuration preference includes at least one of a preferred set of activated secondary nodes of the one or more secondary nodes or a preferred set of deactivated secondary nodes of the one or more secondary nodes.

Aspect 77: The method of any of Aspects 74-76, wherein the secondary node configuration preference includes at least one of a preferred set of non-dormant activated secondary nodes of the one or more secondary nodes or a preferred set of dormant activated secondary nodes of the one or more secondary nodes.

Aspect 78: The method of any of Aspects 74-77, wherein the secondary node configuration preference includes a UE feedback preference for the one or more secondary nodes.

Aspect 79: The method of Aspect 78, wherein the UE feedback preference indicates a preference for layer 1 feedback or layer 2 feedback from the UE for communications received from the one or more secondary nodes.

Aspect 80: The method of any of Aspects 78-79, wherein the UE feedback preference indicates a preference to send feedback for communications received from the one or more secondary nodes to the one or more secondary nodes or a preference to send feedback for communications received from the one or more secondary nodes to the master node.

Aspect 81: The method of any of Aspects 64-80, wherein the assistance information is included in at least one of a radio resource control communication, a medium access control (MAC) control element, or a channel status information report.

Aspect 82: The method of any of Aspects 64-81, wherein the communication is at least one of a radio resource control communication, physical downlink control channel downlink control information, or a medium access control (MAC) control element.

Aspect 83: The method of any of Aspects 64-82, wherein the assistance information is included in at least one of a call setup request, a call resume request, or a measurement report for a call handover.

Aspect 84: The method of Aspect 83, wherein the communication includes the secondary node configuration, and the secondary node configuration specifies at least one of a configuration of the one or more secondary nodes for multiple connectivity communications or a re-configuration of the one or more secondary nodes for multiple connectivity communications.

Aspect 85: The method of any of Aspects 64-84, wherein the assistance information is transmitted to the base station during an ongoing call.

Aspect 86: The method of Aspect 85, wherein the communication includes an indication of a state change for at least one secondary node of the one or more secondary nodes.

Aspect 87: The method of any of Aspects 85-86, wherein the PDCP preference includes at least one of a PDCP sequence gap preference or a PDCP arrival time preference, and the communication includes an indication relating to scheduling delivery of the sequence of PDCP packages based at least in part on the at least one of the PDCP sequence gap preference or the PDCP arrival time preference.

Aspect 88: The method of any of Aspects 85-87, wherein the PDCP preference includes at least one of a PDCP sequence gap preference or a PDCP arrival time preference, and the communication includes at least one PDCP package of a sequence of PDCP packages scheduled based at least in part on the at least one of the PDCP sequence gap preference or the PDCP arrival time preference.

Aspect 89: The method of any of Aspects 85-88, wherein the secondary node configuration preference includes a UE feedback preference, and the communication includes an indication of a change to a feedback mode for the UE based at least in part on the UE feedback preference.

Aspect 90: A method of wireless communication performed by a base station, comprising: receiving, from a user equipment (UE), assistance information that indicates at least one of a packet data convergence protocol (PDCP) preference or a secondary node configuration preference for multiple connectivity communications from a master node and one or more secondary nodes; and transmitting, to the UE, a communication that indicates at least one of a secondary node configuration or a routing of a sequence of PDCP packages across the master node and one or more active secondary nodes.

Aspect 91: The method of Aspect 90, further comprising: coordinating scheduling of multiple connectivity communications to the UE with one or more other base stations based at least in part on the at least one of the PDCP preference or the secondary node configuration preference.

Aspect 92: The method of Aspect 91, wherein the PDCP preference includes at least one of a PDCP sequence gap preference or a PDCP arrival time preference, and coordinating scheduling of multiple connectivity communications to the UE with the one or more other base stations comprises coordinating scheduling of delivery of the PDCP sequence to the UE with the one or more other base stations based at least in part on the at least one of the PDCP sequence gap preference or the PDCP arrival time preference.

Aspect 93: The method of any of Aspects 90-92, wherein the base station is at least one of the master node or a secondary node of the one or more secondary nodes.

Aspect 94: The method of any of Aspects 90-93, wherein the assistance information includes the PDCP preference.

Aspect 95: The method of Aspect 94, wherein the PDCP preference includes a preference for a PDCP sequence gap for the PDCP packages transmitted by the master node and the one or more active secondary nodes.

Aspect 96: The method of Aspect 95, wherein the preference for the PDCP sequence gap includes at least one of a minimum PDCP sequence gap or a maximum PDCP sequence gap.

Aspect 97: The method of any of Aspects 95-96, wherein the preference for the PDCP sequence gap is based at least in part on a buffer size of the UE or latency parameters for traffic associated with the UE.

Aspect 98: The method of any of Aspects 94-97, wherein the PDCP preference includes a PDCP arrival time preference for the PDCP packages transmitted by the master node and the one or more active secondary nodes.

Aspect 99: The method of Aspect 98, wherein the PDCP arrival time preference indicates a preferred maximum time difference between arrivals of consecutive PDCP packages of the sequence of PDCP packages from the master node and the one or more active secondary nodes.

Aspect 100: The method of any of Aspects 98-99, wherein the PDCP arrival time preference is based at least in part on a buffer size of the UE or latency parameters for traffic associated with the UE.

Aspect 101: The method of any of Aspects 94-100, wherein the PDCP preference includes at least one of a PDCP splitting preference that specifies a preference for the master node or one of the active secondary nodes to perform splitting of the sequence of PDCP packages, or a PDCP routing preference that specifies a preference for the master node or one of the active secondary nodes to perform routing of the sequence of PDCP packages.

Aspect 102: The method of any of Aspects 90-101, wherein the assistance information includes the secondary node configuration preference.

Aspect 103: The method of Aspect 102, wherein the secondary node configuration preference includes at least one of a preferred number of activated secondary nodes or a preferred number of deactivated secondary nodes.

Aspect 104: The method of any of Aspects 102-103, wherein the secondary node configuration preference includes at least one of a preferred set of activated secondary nodes of the one or more secondary nodes or a preferred set of deactivated secondary nodes of the one or more secondary nodes.

Aspect 105: The method of any of Aspects 102-104, wherein the secondary node configuration preference includes at least one of a preferred set of non-dormant activated secondary nodes of the one or more secondary nodes or a preferred set of dormant activated secondary nodes of the one or more secondary nodes.

Aspect 106: The method of any of Aspects 102-105, wherein the secondary node configuration preference includes a UE feedback preference for the one or more secondary nodes.

Aspect 107: The method of Aspect 106, wherein the UE feedback preference indicates a preference for layer 1 feedback or layer 2 feedback from the UE for communications received from the one or more secondary nodes.

Aspect 108: The method of any of Aspects 106-107, wherein the UE feedback preference indicates a preference to send feedback for communications received from the one or more secondary nodes to the one or more secondary nodes or a preference to send feedback for communications received from the one or more secondary nodes to the master node.

Aspect 109: The method of any of Aspects 90-108, wherein the assistance information is included in at least one of a radio resource control communication, a medium access control (MAC) control element, or a channel status information report.

Aspect 110: The method of any of Aspects 90-109, wherein the communication is at least one of a radio resource control communication, physical downlink control channel downlink control information, or a medium access control (MAC) control element.

Aspect 111: The method of any of Aspects 90-110, wherein the assistance information is included in at least one of a call setup request, a call resume request, or a measurement report for a call handover.

Aspect 112: The method of Aspect 111, wherein the communication includes the secondary node configuration, and the secondary node configuration specifies at least one of a configuration of the one or more secondary nodes for multiple connectivity communications or a re-configuration of the one or more secondary nodes for multiple connectivity communications.

Aspect 113: The method of any of Aspects 90-112, wherein the assistance information is received by the base station during an ongoing call.

Aspect 114: The method of Aspect 113, wherein the communication includes an indication of a state change for at least one secondary node of the one or more secondary nodes.

Aspect 115: The method of any of Aspects 113-114, wherein the PDCP preference includes at least one of a PDCP sequence gap preference or a PDCP arrival time preference, and the communication includes an indication relating to scheduling delivery of the sequence of PDCP packages based at least in part on the at least one of the PDCP sequence gap preference or the PDCP arrival time preference.

Aspect 116: The method of any of Aspects 113-115, wherein the PDCP preference includes at least one of a PDCP sequence gap preference or a PDCP arrival time preference, and the communication includes at least one PDCP package of the sequence of PDCP packages scheduled based at least in part on the at least one of the PDCP sequence gap preference or the PDCP arrival time preference.

Aspect 117: The method of any of Aspects 113-116, wherein the secondary node configuration preference includes a UE feedback preference, and the communication includes an indication of a change to a feedback mode for the UE based at least in part on the UE feedback preference.

Aspect 118: An apparatus for wireless communication at a device, comprising a processor; memory coupled with the processor; and instructions stored in the memory and executable by the processor to cause the apparatus to perform the method of one or more of Aspects 1-15.

Aspect 119: An apparatus for wireless communication at a device, comprising a processor; memory coupled with the processor; and instructions stored in the memory and executable by the processor to cause the apparatus to perform the method of one or more of Aspects 16-32.

Aspect 120: An apparatus for wireless communication at a device, comprising a processor; memory coupled with the processor; and instructions stored in the memory and executable by the processor to cause the apparatus to perform the method of one or more of Aspects 33-47.

Aspect 121: An apparatus for wireless communication at a device, comprising a processor; memory coupled with the processor; and instructions stored in the memory and executable by the processor to cause the apparatus to perform the method of one or more of Aspects 48-63.

Aspect 122: An apparatus for wireless communication at a device, comprising a processor; memory coupled with the processor; and instructions stored in the memory and executable by the processor to cause the apparatus to perform the method of one or more of Aspects 64-89.

Aspect 123: An apparatus for wireless communication at a device, comprising a processor; memory coupled with the processor; and instructions stored in the memory and executable by the processor to cause the apparatus to perform the method of one or more of Aspects 90-117.

Aspect 124: A device for wireless communication, comprising a memory and one or more processors coupled to the memory, the one or more processors configured to perform the method of one or more of Aspects 1-117.

Aspect 125: A device for wireless communication, comprising a memory and one or more processors coupled to the memory, the one or more processors configured to perform the method of one or more of Aspects 16-32.

Aspect 126: A device for wireless communication, comprising a memory and one or more processors coupled to the memory, the one or more processors configured to perform the method of one or more of Aspects 33-47.

Aspect 127: A device for wireless communication, comprising a memory and one or more processors coupled to the memory, the one or more processors configured to perform the method of one or more of Aspects 48-63.

Aspect 128: A device for wireless communication, comprising a memory and one or more processors coupled to the memory, the one or more processors configured to perform the method of one or more of Aspects 64-89.

Aspect 129: A device for wireless communication, comprising a memory and one or more processors coupled to the memory, the one or more processors configured to perform the method of one or more of Aspects 90-117.

Aspect 130: An apparatus for wireless communication, comprising at least one means for performing the method of one or more of Aspects 1-15.

Aspect 131: An apparatus for wireless communication, comprising at least one means for performing the method of one or more of Aspects 16-32.

Aspect 132: An apparatus for wireless communication, comprising at least one means for performing the method of one or more of Aspects 33-47.

Aspect 133: An apparatus for wireless communication, comprising at least one means for performing the method of one or more of Aspects 48-63.

Aspect 134: An apparatus for wireless communication, comprising at least one means for performing the method of one or more of Aspects 64-89.

Aspect 135: An apparatus for wireless communication, comprising at least one means for performing the method of one or more of Aspects 90-117.

Aspect 136: A non-transitory computer-readable medium storing code for wireless communication, the code comprising instructions executable by a processor to perform the method of one or more of Aspects 1-15.

Aspect 137: A non-transitory computer-readable medium storing code for wireless communication, the code comprising instructions executable by a processor to perform the method of one or more of Aspects 16-32.

Aspect 138: A non-transitory computer-readable medium storing code for wireless communication, the code comprising instructions executable by a processor to perform the method of one or more of Aspects 33-47.

Aspect 139: A non-transitory computer-readable medium storing code for wireless communication, the code comprising instructions executable by a processor to perform the method of one or more of Aspects 48-63.

Aspect 140: A non-transitory computer-readable medium storing code for wireless communication, the code comprising instructions executable by a processor to perform the method of one or more of Aspects 64-89.

Aspect 141: A non-transitory computer-readable medium storing code for wireless communication, the code comprising instructions executable by a processor to perform the method of one or more of Aspects 90-117.

Aspect 142: A non-transitory computer-readable medium storing a set of instructions for wireless communication, the set of instructions comprising one or more instructions that, when executed by one or more processors of a device, cause the device to perform the method of one or more of Aspects 1-15.

Aspect 143: A non-transitory computer-readable medium storing a set of instructions for wireless communication, the set of instructions comprising one or more instructions that, when executed by one or more processors of a device, cause the device to perform the method of one or more of Aspects 16-32.

Aspect 144: A non-transitory computer-readable medium storing a set of instructions for wireless communication, the set of instructions comprising one or more instructions that, when executed by one or more processors of a device, cause the device to perform the method of one or more of Aspects 33-47.

Aspect 145: A non-transitory computer-readable medium storing a set of instructions for wireless communication, the set of instructions comprising one or more instructions that, when executed by one or more processors of a device, cause the device to perform the method of one or more of Aspects 48-63.

Aspect 144: A non-transitory computer-readable medium storing a set of instructions for wireless communication, the set of instructions comprising one or more instructions that, when executed by one or more processors of a device, cause the device to perform the method of one or more of Aspects 64-89.

Aspect 145: A non-transitory computer-readable medium storing a set of instructions for wireless communication, the set of instructions comprising one or more instructions that, when executed by one or more processors of a device, cause the device to perform the method of one or more of Aspects 90-117.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication, comprising:
one or more memories comprising instructions; and
one or more processors configured to execute the instructions and cause the apparatus to:
output assistance information that indicates a secondary node configuration preference for multiple connectivity communications, wherein the secondary node configuration preference includes a feedback preference; and
obtain a communication that indicates a secondary node configuration.

2. The apparatus of claim 1, wherein the secondary node configuration preference includes at least one of a preferred quantity of activated secondary nodes or a preferred quantity of deactivated secondary nodes.

3. The apparatus of claim 1, wherein the secondary node configuration preference includes at least one of a preferred set of activated secondary nodes of the one or more secondary nodes or a preferred set of deactivated secondary nodes of the one or more secondary nodes.

4. The apparatus of claim 1, wherein the secondary node configuration preference includes at least one of a preferred set of non-dormant activated secondary nodes of the one or more secondary nodes or a preferred set of dormant activated secondary nodes of the one or more secondary nodes.

5. The apparatus of claim 1, wherein the feedback preference includes a preference for layer 1 feedback or layer 2 feedback associated with one or more communications by the apparatus.

6. The apparatus of claim 1, wherein the assistance information is output for transmission via and in at least one of a call setup request, a call resume request, or a measurement report.

7. The apparatus of claim 1, wherein the secondary node configuration specifies at least one of a configuration of the one or more secondary nodes for multiple connectivity communications or a re-configuration of the one or more secondary nodes for multiple connectivity communications.

8. The apparatus of claim 1, wherein the assistance information is output during an ongoing call.

9. The apparatus of claim 1, wherein the communication includes an indication of an adjustment to the secondary node configuration.

10. The apparatus of claim 1, wherein the communication includes an indication of a change to a feedback mode, the change to the feedback mode being based at least in part on the feedback preference.

11. The apparatus of claim 1, wherein the assistance information further indicates a packet data convergence protocol preference for the multiple connectivity communications.

12. The apparatus of claim 1, wherein the secondary node configuration preference is based at least in part on at least one of a buffer size, a radio frequency variation, a quality of service (QOS) parameter, a power consumption, or a mobility.

13. The apparatus of claim 1, wherein the secondary node configuration indicates a layer 1 feedback mode or a layer 2 feedback mode.

14. A method of wireless communication performed at a user equipment (UE), comprising:
outputting assistance information that indicates a secondary node configuration preference for multiple connectivity communications, wherein the secondary node configuration preference includes a feedback preference; and
obtaining a communication that indicates a secondary node configuration.

15. The method of claim 14, wherein the secondary node configuration preference includes at least one of a preferred quantity of activated secondary nodes or a preferred quantity of deactivated secondary nodes.

16. The method of claim 14, wherein the secondary node configuration preference includes at least one of a preferred set of activated secondary nodes of the one or more secondary nodes or a preferred set of deactivated secondary nodes of the one or more secondary nodes.

17. The method of claim 14, wherein the secondary node configuration preference includes at least one of a preferred set of non-dormant activated secondary nodes of the one or more secondary nodes or a preferred set of dormant activated secondary nodes of the one or more secondary nodes.

18. The method of claim 14, wherein the feedback preference includes a preference for layer 1 feedback or layer 2 feedback associated with one or more communications by the UE.

19. The method of claim 14, wherein the assistance information is output via and in at least one of a call setup request, a call resume request, or a measurement report for a call handover.

20. A user equipment (UE), comprising:
one or more transceivers;
one or more memories comprising instructions; and
one or more processors configured to execute the instructions and cause the UE to:
transmit, via the one or more transceivers, assistance information that indicates a secondary node configuration preference for multiple connectivity communications, wherein the secondary node configuration preference includes a feedback preference; and
receive, via the one or more transceivers, a communication that indicates a secondary node configuration.

* * * * *